April 14, 1964

M. C. PAULL 3,129,407

SWITCHING NETWORK CONTROL SYSTEM

Filed Nov. 24, 1961

INVENTOR
M. C. PAULL
BY R. C. Winter
ATTORNEY

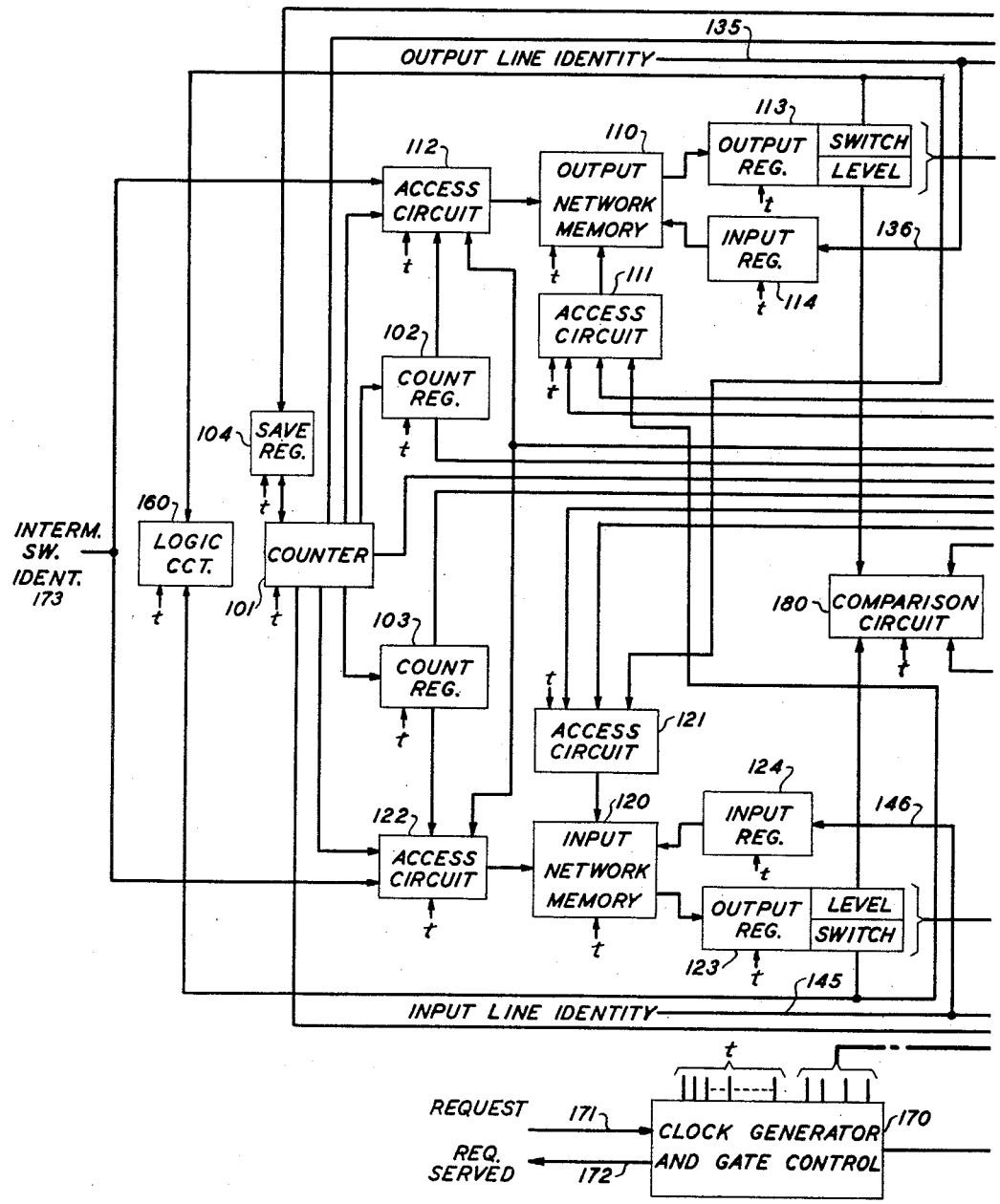

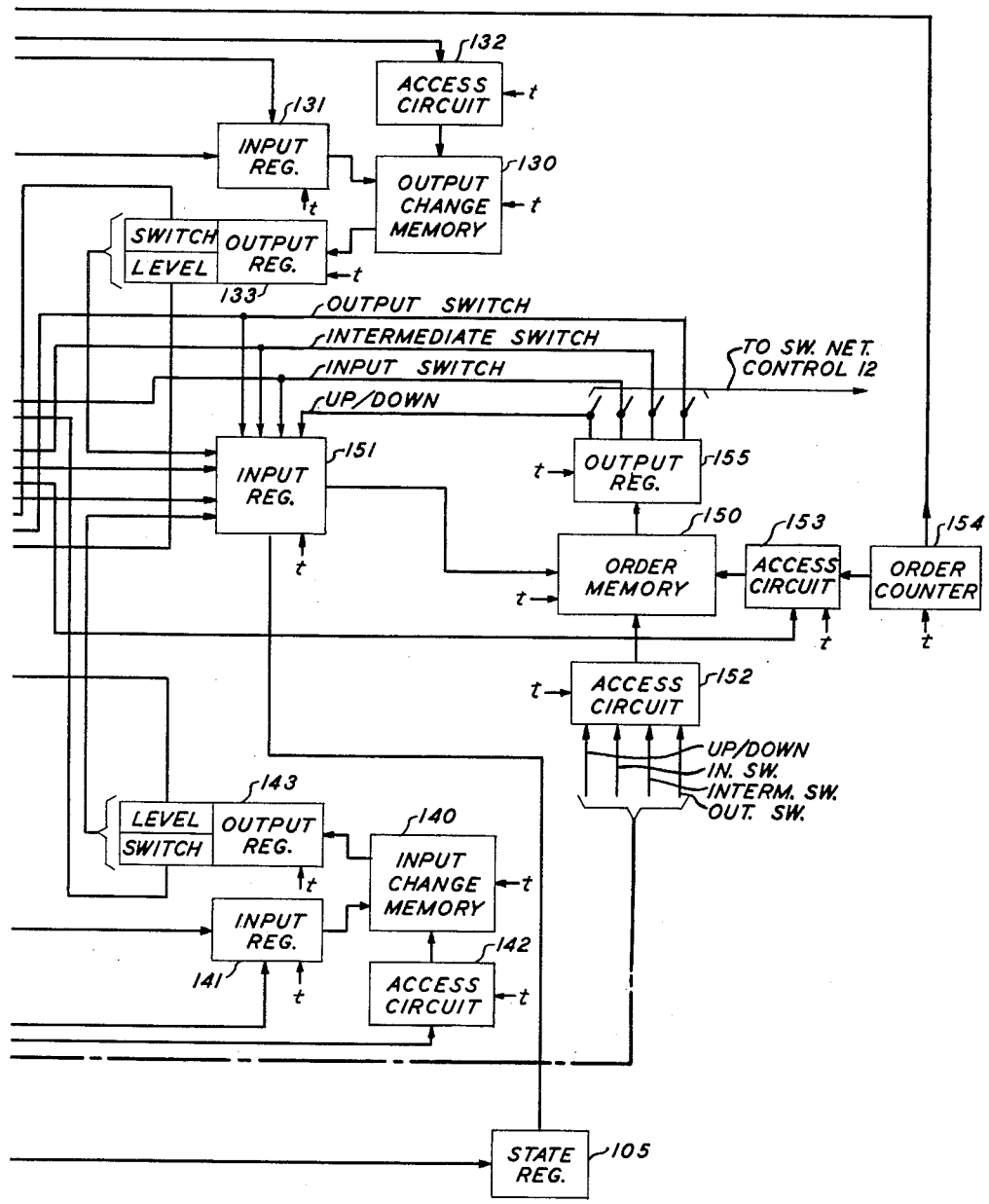

April 14, 1964    M. C. PAULL    3,129,407
SWITCHING NETWORK CONTROL SYSTEM
Filed Nov. 24, 1961    15 Sheets-Sheet 4
FIG. 4A
(COMPOSITE NETWORK)
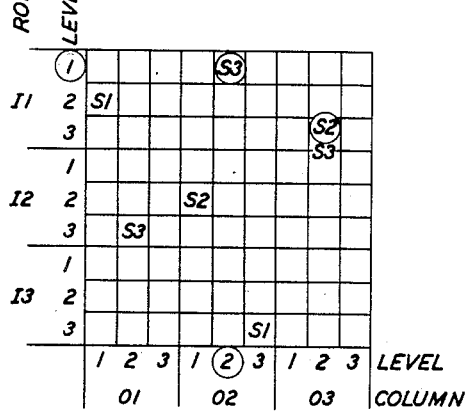
FIG. 4B
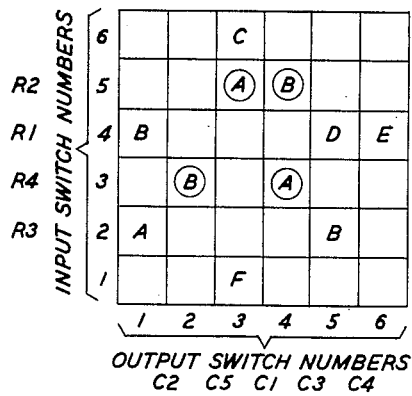
FIG. 4C
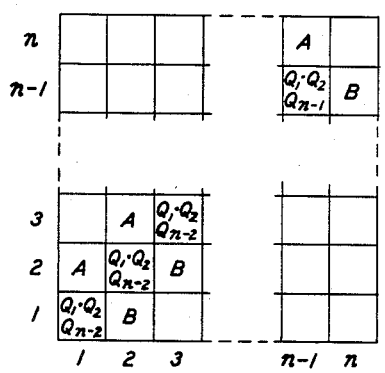
FIG. 5
(OUTPUT NETWORK MEMORY 110)
| | INPUT SWITCH ADDRESS | | |
|---|---|---|---|
| | I1 | I2 | I3 |
| S1 | OUTPUT SW. O1, LEVEL 1 | | |
| S2 | | OUTPUT SW. O2, LEVEL 1 | |
| S3 | OUTPUT SW. O3, LEVEL 2 | OUTPUT SW. O2, LEVEL 2 | |

April 14, 1964     M. C. PAULL     3,129,407

SWITCHING NETWORK CONTROL SYSTEM

Filed Nov. 24, 1961

FIG. 6
(INPUT NETWORK MEMORY 120)

OUTPUT SWITCH ADDRESS

|    | O1 | O2 | O3 |
|----|----|----|----|
| S1 | INPUT SW. I1, LEVEL 2 | | |
| S2 | | INPUT SW. I2, LEVEL 2 | |
| S3 | INPUT SW. I2, LEVEL 3 | | INPUT SW. I1, LEVEL 3 |

FIG. 8
(OUTPUT CHANGE MEMORY 130)

| | SWITCH NO. | LEVEL NO. |
|---|---|---|
| 1 | O2 | 1 |
| 2 | O3 | 2 |
| ⋮ | | |
| n | | |

FIG. 7
(ORDER MEMORY 150)

| | UP/DOWN | INPUT SWITCH | INTERM. SWITCH | OUTPUT SWITCH |
|---|---|---|---|---|
| 1 | DOWN | I1, 3 ~~I1,1~~ | S3 | O3, 2 |
| 2 | UP | I1, 3 ~~I1,1~~ | S2 | O3, 2 |
| 3 | UP | I1, 1 | S3 | O2, 2 |
| ⋮ | | | | |
| n | | | | |

FIG. 9
(INPUT CHANGE MEMORY 140)

| | SWITCH NO. | LEVEL NO. |
|---|---|---|
| 1 | I1 | 1 |
| 2 | I2 | 2 |
| ⋮ | | |
| n | | |

(LOGIC 160)

(OR GATE)

(COMPARISON CCT. 180)

(AND GATE)

April 14, 1964   M. C. PAULL   3,129,407
SWITCHING NETWORK CONTROL SYSTEM
Filed Nov. 24, 1961   15 Sheets-Sheet 9

April 14, 1964 M. C. PAULL 3,129,407
SWITCHING NETWORK CONTROL SYSTEM
Filed Nov. 24, 1961 15 Sheets-Sheet 10

April 14, 1964  M. C. PAULL  3,129,407
SWITCHING NETWORK CONTROL SYSTEM
Filed Nov. 24, 1961  15 Sheets-Sheet 12

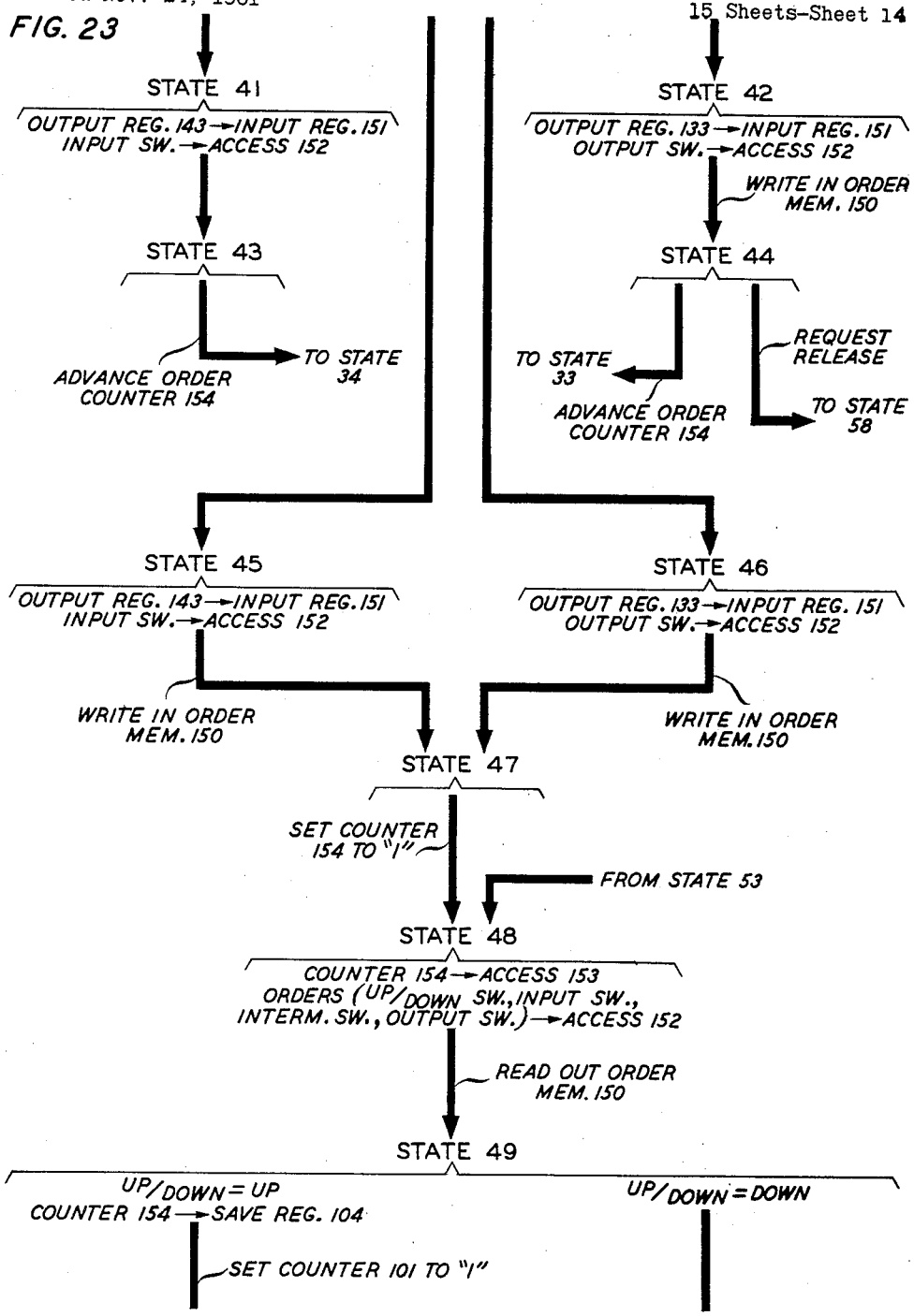

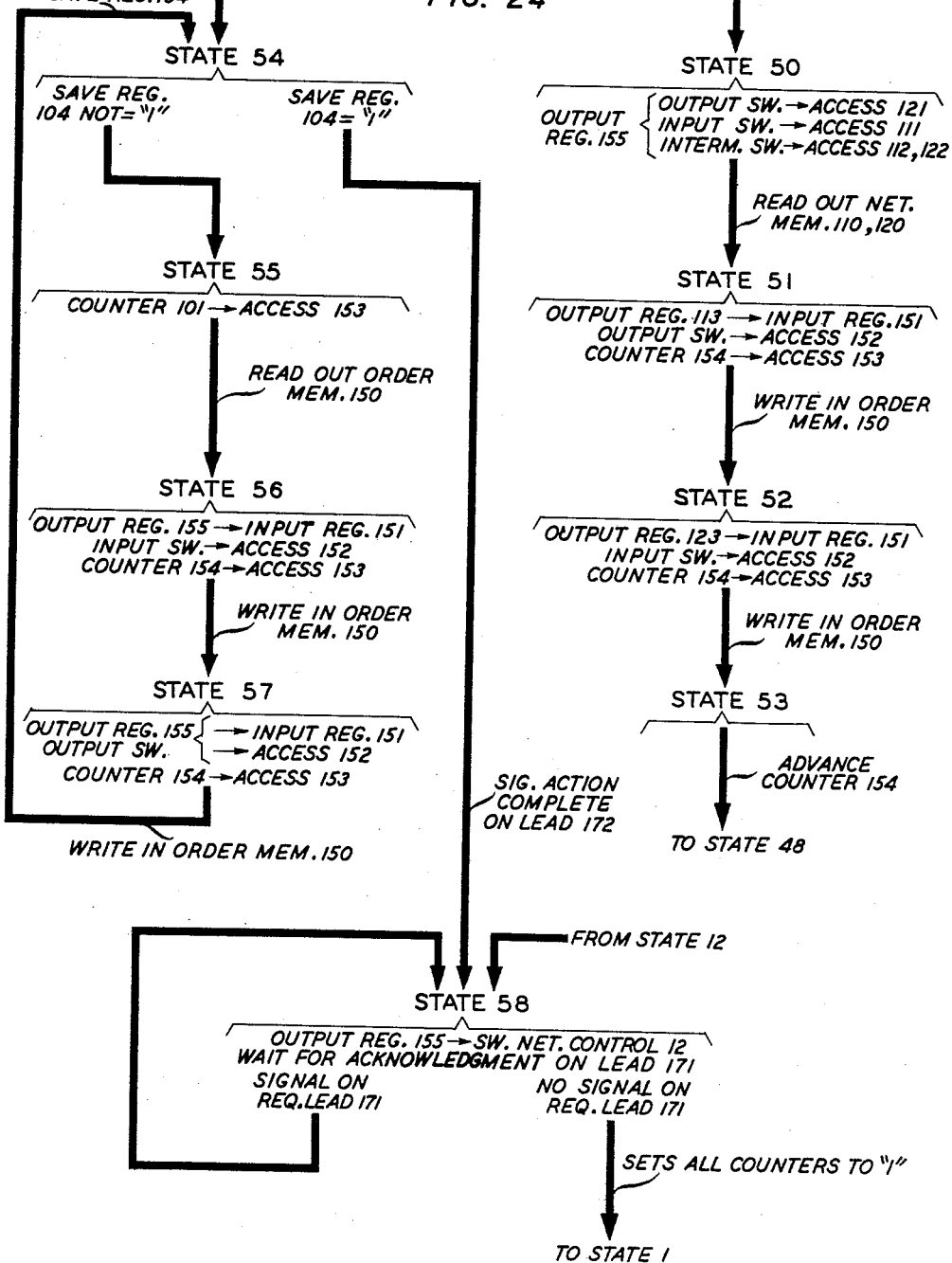

United States Patent Office 3,129,407
Patented Apr. 14, 1964

3,129,407
SWITCHING NETWORK CONTROL SYSTEM
Marvin C. Paull, Denville, N.J., assignor to Bell Telephone Laboratories, Incorporated, New York, N.Y., a corporation of New York
Filed Nov. 24, 1961, Ser. No. 154,477
20 Claims. (Cl. 340—147)

This invention relates to switching systems and more particularly to the control of multistage switching networks to unblock paths through such networks by the physical rearrangement of existing connections.

It is possible that a multistage switching network, by virtue of its flexibility in the choice of intermediate switches for connections through the network, may itself be the cause of blocked connections; viz., the inability to complete connections between an input line and an output line despite the fact that neither line is already connected. Thus an input line desiring connection through the network has a choice initially of a plurality of paths via intermediate stage switches to the desired output line. However, other lines have access to the same intermediate stage switches, and in those instances where active connections already occupy at least one interstage link in every possible path between the lines desiring connection, the potential connection is blocked.

A variety of nonblocking schemes are available in the art in which the degree of nonblocking afforded by the network is directly related to the size and capacity of the switches employed in the network. Thus, with a fixed number of input and output lines and a knowledge of the traffic requirements or expected use of these lines in a given period, the network may be designed to have sufficient capacity to assure that a path will always be available through the network for each desired connection.

Such nonblocking proposals are set forth in an article by C. Clos, "A Study of Non-blocking Switching Networks," Bell System Technical Journal, March 1953, pages 406–424. Later schemes provided adaptations of the Clos nonblocking arrangement which, in general, reduced the switch capacity, while permitting a level of blocking which might be tolerated in the network assigned to perform a particular operation. Such arrangements are disclosed, for example, in J. C. Gibson et al. Patent 2,945,211, issued July 12, 1960, and in A. Zarouni Patent 3,041,409, issued June 26, 1962.

The instant invention marks a radical departure from the basic concepts set forth in the above-noted nonblocking network arrangements. Thus rather than attempting to provide sufficient capacity to obviate blocking, the system in accordance with my invention, upon detecting the presence of a blocked connection, orders a physical rearrangement of active network connections so as to free a path through the network for the potential connection.

It is therefore a general object of this invention to provide an improved switching system in which blocking conditions encountered in the switching network may be overcome.

It is another object of this invention to provide a switching system which is economical of switching network components while providing the degree of operation reliability found in a nonblocking switching system.

It is a further object of this invention to control the operation of a blocked switching network so as to remove the blocking condition in a minimum time without affecting the quality of existing connections through the network.

It is another object of this invention to reduce the size and space requirements for a switching network while retaining the quality of service afforded by a completely nonblocking switching network.

These and other objects of the invention are attained in accordance with features thereof by the employment of a network control circuit which stores an indication of every active connection through the network. As each new request for connection of particular input and output switches through the network is received, the network control is first interrogated to determine whether or not intermediate stage switch facilities are currently available to complete the desired connection. If such facilities are available, the network control immediately orders completion of the connection, and a record of the newly activated connection is stored in the network control. However, if a potential connection is found by interrogation of the network control to be physically blocked, the network control performs a series of logic operations designed to determine the manner in which the network may be physically rearranged so as to permit completion of the desired new connection.

I have found that, in order to unblock the network for completion of a potential connection, no more than $n-1$ existing connections through the network must be disturbed where the network contains $n$, $n \times n$ switches in each stage. Furthermore, for every $n$ greater than 1, there is at least one network state in which $n-1$ active connections must be disturbed in order to unblock a blocked connection. The control functions performed by the network control are designed in accordance with these conclusions, such that a network rearrangement may be effected in a minimum time.

Once having determined the active connections which must be taken down and again the particular connections which must be established in order to free the network for the potential call, the network control automatically alerts the network to carry out the orders and to report back the results. In this fashion the new network pattern is recorded in the control memory in preparation for the next desired connection through the network.

In accordance with one aspect of this invention, an auxiliary intermediate switch is provided such that connections taken down during the rearrangement process are established through the auxiliary switch pending completion of the rearrangement in the basic network. In this fashion the active connections, from the standpoint of the input and output lines, remain undisturbed throughout the operation.

It is a feature of this invention that control circuitry be provided to permit completion of an initially blocked connection by rearrangement of existing connections through a switching network.

It is another feature of this invention that a network control circuit be provided which maintains a record of existing network connections and directs the rearrangement of the network to provide a path for a potential connection which is found, upon interrogation of the network pattern, to be initially blocked.

It is a further feature of this invention that a control circuit be provided which will unblock a switching network to a potential connection by disestablishing a plurality of existing connections and reestablishing them through switches distinct from those employed in the original connections.

More particularly, it is a feature of this invention that a control circuit be provided which will unblock a switching network comprising $n$, $n \times n$ switches in each stage so as to serve a potential, initially blocked connection by disturbing no more than $n-1$ existing network connections.

It is a further feature of this invention that the network control circuit respond to those network states in which $n-1$ connections may be disturbed in order to unblock the network for a potential connection, there being a finite number of such network states so long as $n$ is greater than 1.

It is still another feature of this invention that the control circuitry permit completion of an initially blocked connection through the switching network consisting of input, intermediate and output switching stages by altering existing connections so as to disturb no more than two intermediate stage switches.

It is a feature in accordance with one aspect of this invention that an auxiliary intermediate stage switch be provided and that the network control circuit, concurrently with the disestablishment of connections pursuant to a rearrangement of the network, establish such connections through the auxiliary switch so as to maintain the existing connections virtually undisturbed.

A complete understanding of this invention and of the above-cited and other features thereof may be gained from consideration of the following detailed description and the accompanying drawing, in which:

FIG. 1 diagrammatically illustrates in simplified form a switching system comprising input, intermediate and output switching stages, lines terminating in both input and output stages, a number of interstage links and the common control circuitry associated therewith;

FIGS. 2 and 3 illustrate, mainly in block diagram form, the switching network control circuit according to the specific illustrative embodiment of this invention;

FIG. 4A is a diagram of the switching network illustrated in FIG. 1, indicating a particular set of connections established through the network in order to illustrate the specific embodiment of the invention;

FIGS. 4B and 4C are generalized diagrams of the switching network utilized in the proof of the unblocking proposition;

FIG. 5 is a diagram of the typical content of the output network memory unit in the network control circuit illustrating the output switches involved in established network connections according to the example indicated in FIG. 4A;

FIG. 6 is a diagram of the typical content of the input network memory unit in the network control circuit illustrating the input switches involved in established network connections according to the example indicated in FIG. 4A;

FIG. 7 is a diagram of the order memory unit in the network control circuit illustrating a record of the orders to the switching network necessary to effect the unblocking of the network to a potential connection according to the example indicated in FIG. 4A;

FIG. 8 is a diagram of the output change memory unit in the network control circuit illustrating particular output switch designations which it has stored according to the example indicated in FIG. 4A;

FIG. 9 is a diagram of the input change memory unit in the network control circuit illustrating particular input switch designations which it has stored according to the example indicated in FIG. 4A;

FIGS. 12A through 14B are symbols and equivalent circuits for designated logic elements utilized in components of the network control circuit of FIGS. 2 and 3; and FIGS. 15 through 24 are diagrams illustrating the timing and progress of the network control circuit of FIGS. 2 and 3 in the performance of a particular network control function and the state of the network control circuit during each step toward the realization of the particular function.

Before pursuing the detailed operation of the switching network control circuit, it may be helpful to consider the theoretical approach to the solution of the blocking problem through physical rearrangement of existing connections in the switching network. It will be assumed for this purpose that the network consists of $n$, $n \times n$ switches in each of an input, an output and a single intermediate stage. It should be noted, however, that this approach may also be utilized to prove the validity of an unblocking arrangement utilizing a plurality of intermediate stages in the switching network or a number of switches in an intermediate stage distinct from the number of switches in the input or output stages.

Figure 1:
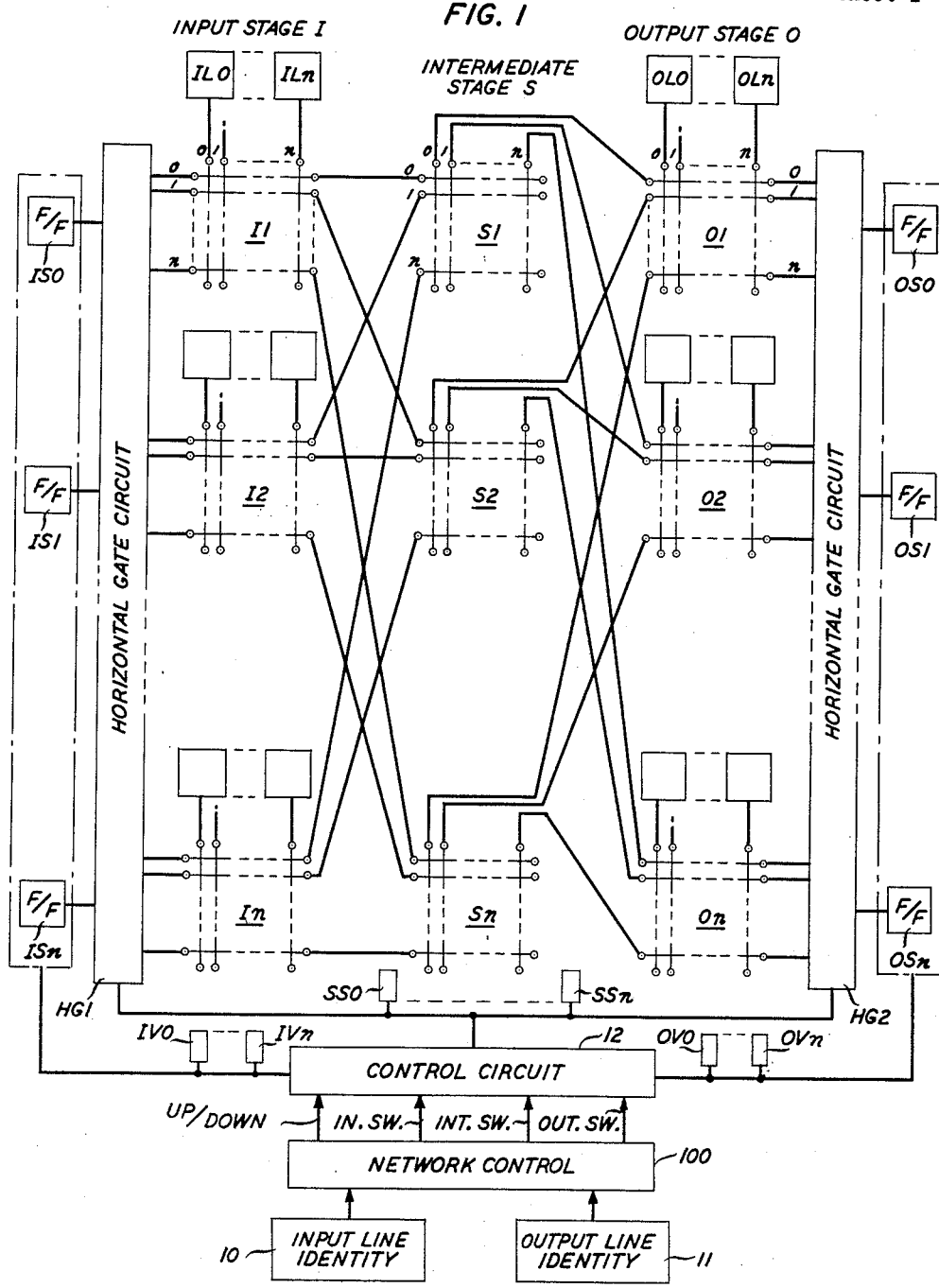
Figure 10:
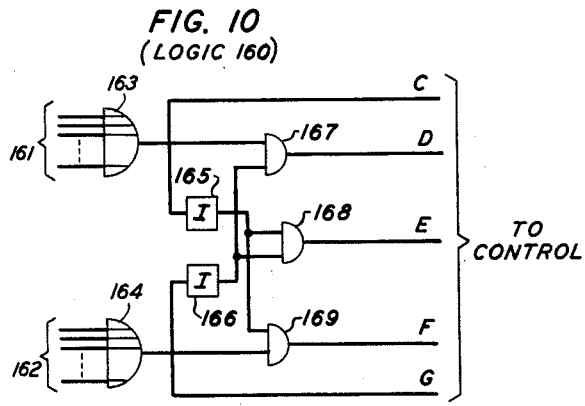
FIG. 10 is a representation of a logic circuit utilized to compare the outputs of the network memories illustrated in FIGS. 5 and 6 and to provide appropriate orders to other circuitry in the network control circuit, dependent upon the results of this comparison.
Figure 13A:
Figure 13B:
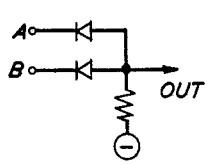
Figure 14A:
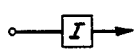
Figure 14B:
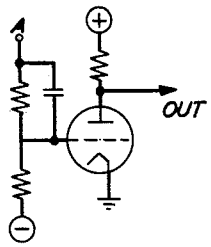
Figure 11:
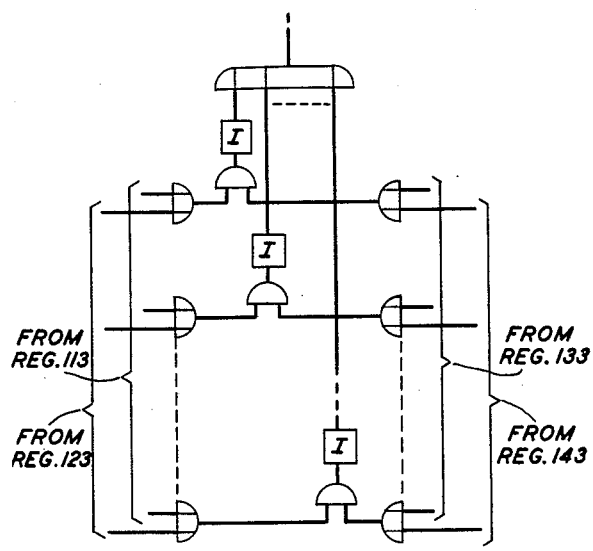
FIG. 11 is a logic circuit utilized to compare the respective outputs of the network memories illustrated in FIGS. 5 and 6 with the respective outputs of the corresponding memories illustrated in FIGS. 8 and 9 and to provide appropriate orders to other circuitry in the network control, dependent upon the results of such comparisons.
Figure 15:
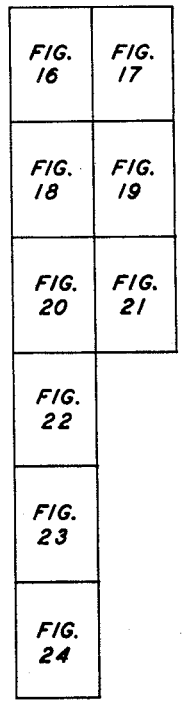
Figure 12A:
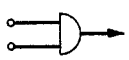
Figure 12B:
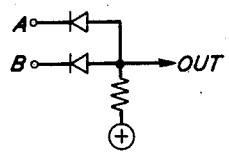
Figure 16:
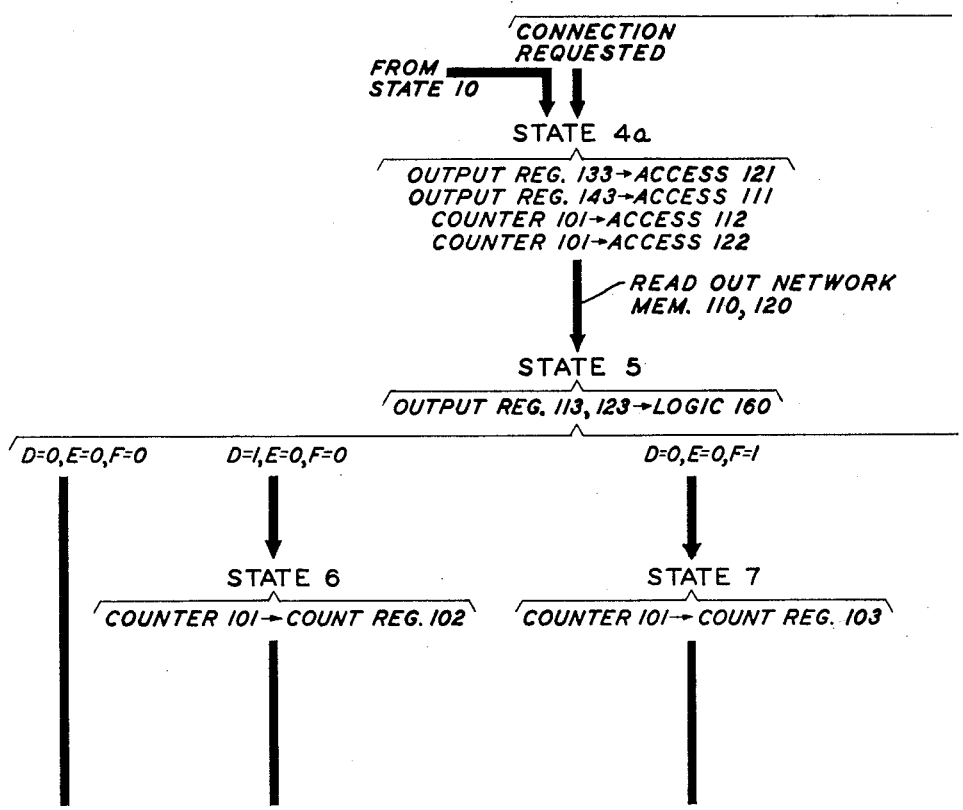
Figure 17:
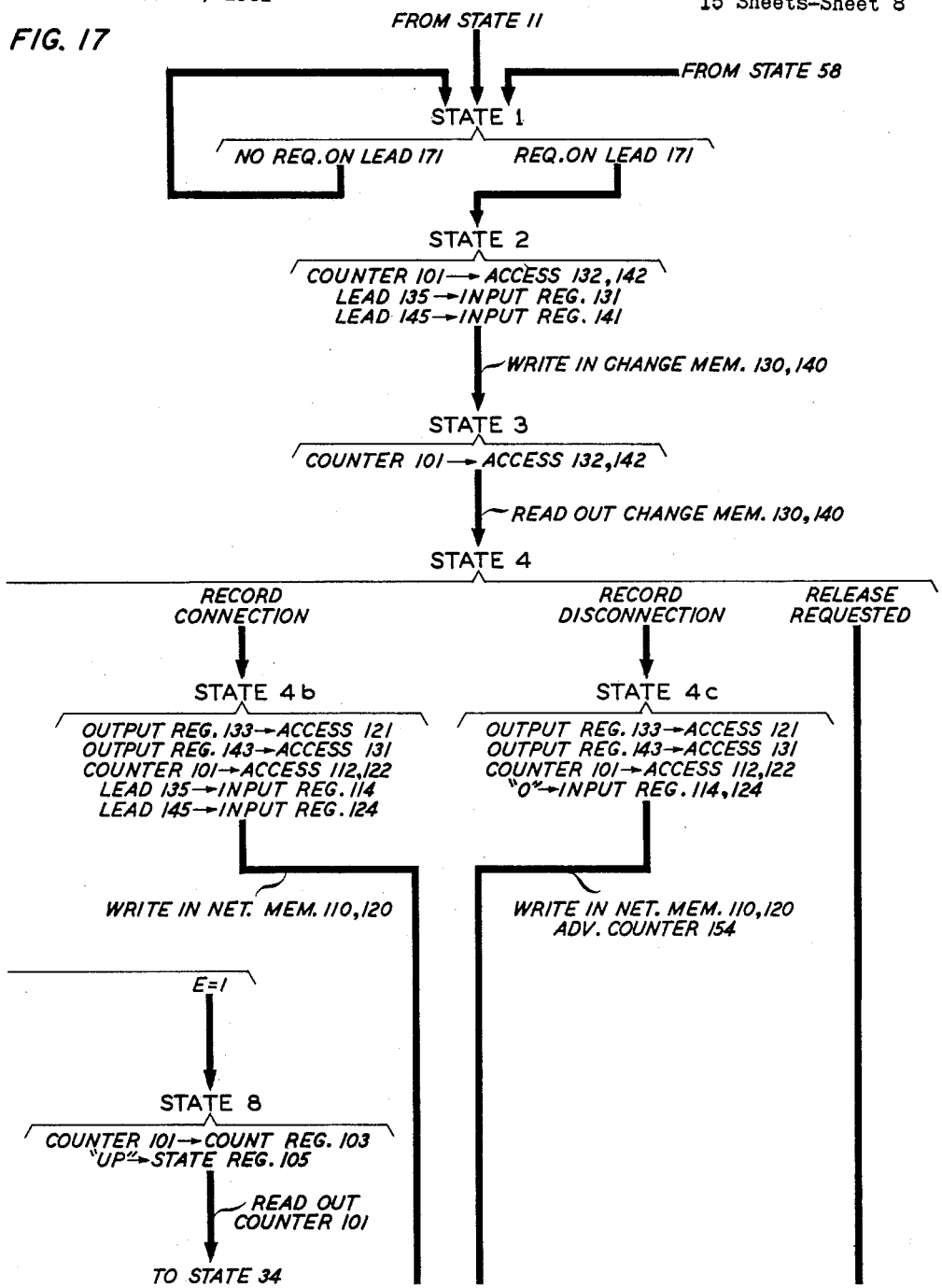

In the three-stage network depicted in FIG. 1, therefore, it is possible that a connection between a first line's termination on an input switch and a second line's termination on an output switch cannot be made despite the fact that neither line is already connected. This could occur, for example, if other connections through the network already occupy at least one link or connection to an intermediate switch in every possible path between the input and output lines in question.

The following proof will demonstrate that the unblocking of the three-stage network to permit such a potential connection will in no case require the disturbance of more than $n-1$ existing connections where the size of the switches in each stage is $n \times n$ and there are $n$ switches per stage. Thus in the network depicted in FIG. 1 it may be assumed that each input switch $I1-In$ has $n$ input lines and $n$ links with the intermediate switches $S1-Sn$. Similarly each output switch $O1-On$ has $n$ links with the intermediate stage and $n$ output lines. In order to facilitate connection, of course, the intermediate switches $S1-Sn$ also are $n \times n$ switches. In such a network, therefore, a blocked potential connection may be unblocked by disturbing $n-1$ existing network connections. Furthermore, for every $n$ greater than 1 there is at least one network state in which $n-1$ calls must be disturbed in order to unblock the network to serve a blocked potential connection.

Alteration of existing connections in the network will be considered. In this regard the input and output switches involved in a particular existing connection are not altered but only the intermediate switch involved in the particular connection. Thus if the network contains a connection between a certain input line and a certain output line which is involved in the network alteration to effect unblocking, the connection will still exist between the same input and output lines after the alteration although a different intermediate switch will now be involved.

The composite network representation in FIG. 4A illustrates some typical network connections. Thus the input stage of the network is represented by three input switches I1, I2 and I3. Each input switch in turn serves three input lines. Similarly the output stage of the network comprises three output switches O1, O2 and O3, each of which also serves three distinct lines. The intermediate stage comprises three switches S1, S2 and S3, each of which has a link with each of the input and output switches thus satisfying the network requirement of $n$, $n \times n$ switches in each stage. Connections through the intermediate stage are represented in the composite network of FIG. 4A by an indication at the crosspoint of an input switch row and an output switch column. Thus, for example, a connection is illustrated as being established between input switch I1, line 2 and output switch O1, line 1 through intermediate switch S1. As this connection serves the input switch and line assigned to the first row and second level in the composite network representation, the designation of the intermediate switch S1 appears in the first row, second level. Also since the connection involves the output switch assigned to the first column and first level of the composite network, the intermediate switch S1 representation will also appear in column 1, level 1. Thus the representation S1 appears at the crosspoint of row 1, level 2 and column 1, level 1 in FIG. 4A.

Each row or column may contain from 0 to $n$ intermediate switch symbols inasmuch as each input (output) switch has one link with each of the intermediate switches. Each intermediate switch symbol in FIG. 4A thus corresponds to a connection from an input switch through the designated intermediate switch to an output switch. Absence of an entry indicates that no connection exists. Although an entry in the matrix also indicates which particular input line is connected to which particular output line, the specification of the interstage links involved in the connection is the important property for ultimately achieving an unblocking of the network.

The state of the switching network which will permit unblocking is restricted to that in which less than all interstage links between intermediate and input or output switches are occupied. Of course the situation in which all intermediate switches are fully utilized presents a traffic problem which will not permit a rearrangement of the existing facilities to provide a path for a potential connection. In the latter situation a rearrangement could only be effected by the ultimate permanent removal of an existing connection. Thus in the network illustrated in FIG. 4A, if all of the intermediate switch designations S1, S2 and S3 appear in any one row or any one column, the switching network is full or unequivocally blocked with respect to lines connected to the input or output switch assigned to that respective row or column, so that an unblocking by physical rearrangement of the network connections cannot be realized without destroying an existing connection.

The type of blocking situation which can be overcome in accordance with this invention is that in which all intermediate switch designations may appear in an input switch row and an output switch column together but less than all intermediate switch designations appear in the row or column alone. This corresponds to the case illustrated in FIG. 4A in which the input line connected to I1, level 1 desires connection through the network to the output line connected to O2, level 2. Row I1 contains S1 and S3 indicating that input switch I1 has previously established connections involving its links with intermediate switches S1 and S3. Similarly output switch O2 has a previously established connection involving its links with intermediate switches S1 and S2. Thus the lines desiring connection are blocked by prior network connections, but a path may be provided by rearranging the network.

*Proof*

For proof of the propositions, reference is made to the composite networks illustrated in FIGS. 4B and 4C, which are generalized versions of the exemplary network illustrated in FIG. 4A. Assume that a potential connection between the input switch corresponding to row $r_1$, FIG. 4B, and the output switch corresponding to column $c_1$ is blocked. This implies that if unequivocal blocking is ruled out, there is a middle switch designated, for example, by the symbol A in column $c_1$ which does not appear in row $r_1$. Similarly there must be a symbol, say B, in row $r_1$ which does not appear in column $c_1$.

Let A be in $(r_2, c_1)$
Let B be in $(r_1, c_2)$

Thus far we have completely defined:

$r_1$ the row in which the blocked connection appears,
$c_1$ the column in which the blocked connection appears,
$r_2$ the row in which the A in column $c_1$ appears, and
$c_2$ the column in which the B in row $r_1$ appears.

Now we wish to define other rows and columns:

$r_3$ the row in which an A appears in column $c_2$ if there is such a row (otherwise $r_3$ is undefined),
$c_3$ the column in which a B appears in row $r_2$ if there is such a column (otherwise $c_3$ is undefined),
$r_4$ the row in which an A appears in column $c_3$ if $c_3$ is defined, and there is such a row (otherwise $r_4$ is undefined),
$c_4$ the column in which a B appears in row $r_3$ if $r_3$ is defined and there is such a column (otherwise $c_4$ is undefined).

In general: for all $j>1$ $r_j$ is defined to be the row in which A appears in column $c_{j-1}$, provided $c_{j-1}$ is defined, and provided that A does appear in column $c_{j-1}$. If not, $r_j$ is undefined.

$c_j$ is defined to be a column in which B appears in row $r_{j-1}$, provided $r_{j-1}$ is defined, and provided that B does appear in row $r_{j-1}$. If not, $c_j$ is not defined.

The above definition has the important property that if $r_j$ and $r_k$ are both defined, and $j \neq k$, then $r_j \neq r_k$. Also if $c_j$ and $c_k$ are both defined, and $j \neq k$, then $c_j \neq c_k$. This is justified by the following argument: consider the sequence:

$$r_1, c_1, r_2, c_2, \ldots r_1, c_1 \qquad (1)$$

Assume there is a first member equal to a previous member of the sequence.

This is either a row or column.

(1) Assume row $r_j$ is the first member of the sequence which is both defined and the same as a previous defined member, say $r_k$, $k \neq j$. First of all $k$ cannot be 1 since $r_j$, $j>1$ is defined to have an A in it, and row $r_1$ has no A in it. So $r_1 \neq r_j$, $j>1$. Now then assume $k>1$, $j>1$, $j \neq k$. Then an A appears in $(r_k, c_{k-1})$, and in $(r_j, c_{j-1})$ (by our definition of $r_j$). So unless $c_{k-1} = c_{j-1}$, $j-1 \neq k-1$, there would be two different A's in row $r_k = r_j$. There cannot be two different A's in a single row. Therefore $c_{k-1} = c_{j-1}$. But this contradicts the assumption that the first member having this property is row $r_j$. That leaves only the possibility of column $c_j$ being the first such member.

(2) Then assume column $c_j$ is the first member of the sequence which is both defined and the same as a previous defined member, say column $c_k$ $k \neq j$. Then $k \neq 1$, because $c_1$ has no B, and $c_j$, $j>1$ does by definition of $c_j$. If $k>1$, $j>1$ $k \neq j$ and $c_j = c_k$, then for similar reasons to those of the above paragraph $r_{j-1} = r_{k-1}$. Therefore our second assumption, $c_j = c_k$, is also contradicted, completing the proof.

Having shown that the defined members of sequence (1) are distinct, we wish now to examine this sequence further. For convenience it is rewritten below.

$$r_1, c_1, r_2, \ldots r_j, c_j, \ldots r_n, c_n \qquad (1)$$

There is a first member of this sequence which is defined but whose succeeding member is undefined, say $c_f$. Since $r_{f+1}$ is the first member of the sequence which is undefined, it follows from the definition of $r_j$ that there is no A column $c_f$. We then know that according to our definition of $c_j$ and $r_j$ the following matrix positions contain A's $$(r_2, c_1); (r_3, c_2); \ldots (r_f, c_{f-1})$$

and the following contain B's $$(r_1, c_2); (r_2, c_3); \ldots (r_{f-1}, c_f)$$

Now in order to unblock $(r_1, c_1)$ we make the following changes.

Change the original B's to A's in columns $c_j: j=3$, 5 ... $f$ if $f$ is odd (or in columns $j=2, 4 \ldots$ if $f$ is even). This involves changing B's to A's in rows $r_j: j=2, 4 \ldots f-1$ if $f$ is odd ($j=1, 3 \ldots f-1$ if $f$ is even).

Change the original A's to B's in rows $r_j$, $j=2$, $4 \ldots f-1$, if $f$ is odd ($j=3, 5 \ldots f-1$ if $f$ is even). This involves changing A's to B's in columns $c_j: j=1$, $3, \ldots f-2$, if $f$ is odd ($j=2, 4 \ldots f-2$, if $f$ is even). Note that the total number of changes is $f-1$.

We see that if $f$ is odd then after the change $(r_1, c_2)$ will still contain a B, but $(r_2, c_1)$ which formerly contained an A now contains a B. Therefore an A may now be legitimate placed in $(r_1, c_1)$. A similar argument holds if $f$ is even.

It remains to show that the changes we have prescribed do not lead to any conflicts. For this demonstration assume $f$ is odd. (A similar argument holds for $f$ even.) The only conflicts possible must involve A's and B's since these are the only symbols changed and resulting from the change. Furthermore, the only conflicts possible are in rows $r_1, r_2 \ldots r_f$ or $c_1, c_2 \ldots c_f$, since these are the only rows and columns in which changes were made. Also at most one A has been added to any row or any column. Similarly at most one B has been added to any row or column. Before the change there were single A's in columns $c_j$, $j=1$ to $f-1$, and in rows $r_j$, $j=2$ to $f$. As a result of the change single A's were added to column $c_i$, $i=2$, $5 \ldots f$ and no others, and to rows $r_i$, $i=2$, $4 \ldots f-1$ and no others. So it is only these columns and rows which could possibly contain more than one A. But these columns and rows each contain only a single A, because although an A has been added to each, the original A in each has been changed to a B. For according to our prescribed changes, the original A's in $c_i$: $i=1, 3 \ldots f-2$ were changed to B's. This takes care of all columns to which an A was added except column $c_f$, and column $c_f$ did not originally contain an A. Also, the original A's in rows $r_i$: $i=2, 4 \ldots f-1$ were changed to B's and this takes care of all rows to which an A was added.

Again as a result of the change, single B's were added to rows $r_i$: $i=2, 4, 6, \ldots f-1$, and to columns $c_i$: $i=1, 3, 5 \ldots f-2$. It is therefore only those columns and rows which could have more than one B. But the original B's in columns $c_j$, $j=3, 5 \ldots f$ have been changed to A's. This takes care of all columns to which a B was added except column $c_1$, and column $c_1$ originally did not have a B. Also the original B's in rows $r_i$: $i=2, 4 \ldots f-1$ were changed A's and this takes care of all rows in which a B was added.

If all members of sequence 1 are defined, then $c_n$ is the last defined member, and there cannot be an A in $c_n$, because such an A would have to be in some row other than row $r_1$. There are A's in all rows other than $r_1$, but none of these A's are in $c_n$. This follows from the definition of $r_j$. From here then the argument goes on as the general case in which $r_{f+1}$ was the first undefined member of sequence 1.

Thus the maximum number of changes required to unblock the network for a potential connection is $n-1$.

The network, FIG. 4C, has $n$ intermediate switches which may be represented by the symbols A, B, $Q_1 \ldots Q_{n-2}$. Assume that (1, 1) is blocked by the following network state:

$(i, i)$; $i=1$ to $n-1$ each contain all the symbols $Q_1, \ldots Q_{n-2}$.

$(i, i+1)$; $i=1$ to $n-1$ each contain the symbol B.

$(i+1, i)$; $i=1$ to $n-1$ each contain the symbol A.

There are no other symbols in the matrix. To unblock (1, 1) the symbols in (1, 2) and (2, 1) must be made the same because:

(a) After any change there must still be $n-2$ different symbols in (1, 1).

(b) There must still be one symbol in (1, 2) different from all those in (1, 1).

(c) There must still be one symbol in (2, 1) different from all those in (1, 1).

(d) If then the symbols in (1, 2) and (2, 1) were different, there would be a total of $n$ symbols in row 1 and column 1, leaving no symbol available to unblock (1, 1).

Assume that the symbols in $(i+1, i)$ and $(i, i+1)$; $i=k-1$ must be the same, say X, in order to unblock (1, 1). Now $(i, i)$; $i=k$, which is in row $k$ must, after the change, still contain $n-2$ different symbols, say $Y_1$, $Y_2 \ldots Y_{n-2}$. The symbol X in $(i+1, i)$; $i=k-1$ which is also in row $k$ must be different from $Y_1, Y_2 \ldots Y_{n-2}$. Therefore the symbol in $(i, i+1)$; $i=k$ which is also in row $k$ must be different than X, $Y_1, Y_2 \ldots Y_{n-2}$. There is only one symbol that can be different from all $n-1$ different symbols X, $Y_1 \ldots Y_{n-2}$, say Z. So Z must appear in $(i, i+1)$, $i=k+1$. Similarly as stated previously $(i, i)$, $i=k$, which is in column $k$, must still have the $n-2$ different symbols $Y_1, Y_2 \ldots Y_{n-2}$.

Also in column $k$ the symbol X is in position $(i, i+1)$, $i=k-1$. Therefore it follows that the symbol in $(i+1, i)$, $i=k$, which is also in column $k$ must be different than X, $Y_1, \ldots Y_{n-2}$, and must be Z.

Hence the induction is complete proving that if $(i, i)$ $i=1$ to $n-1$, each contain $n-2$ different symbols (this must be true because of the given initial network state) and (1, 1) is to be unblocked then for each $i=1$ to $n-1$, the pair $(i+1, i)$ and $(i, i+1)$ must contain the same symbol. Since initially $(i+1, i)$ contained a different symbol from $(i, i+1)$ for $i=1$ to $n-1$, at least $n-1$ changes are necessary to put the network in a state both equivalent to its initial state, and in which (1, 1) is unblocked.

Switching Network

For the particular illustrative embodiment of the invention described hereinafter, a three-stage network is chosen, as depicted in FIG. 1. The switching arrangement is of course not of immediate concern inasmuch as the invention resides primarily in the control of a multi-stage network rather than in the network itself. Thus the switching components of the network and their interconnection may take any one of a variety of forms, a crossbar network arrangement familiar to the art being illustrated in FIG. 1. For the sake of a clear understanding of the network control to follow, however, the arrangement and operation of the depicted crossbar switching network will be described in brief.

Each of the input (I), intermediate (S) and output (O) switching stages includes a plurality of crossbar switches I1—I$n$, S1—S$n$, O1—O$n$. Each switch in turn is represented by a plurality of vertical paths intersected by a plurality of horizontal paths. Each vertical and horizontal path is intended to symbolize a plurality of conductors and each intersection or crosspoint of a vertical path with a horizontal path symbolizes a plurality of circuit establishing devices; e.g., relay contacts, whereby electrically conductive paths may be selectively set up between the corresponding conductors represented by any vertical path and any horizontal path.

Each vertical path in each input and output switch is connected to a distinct communication line. The horizontal paths in each input switch are linked in a slip-multiple pattern to the horizontal paths in the intermediate switches in such a manner that each input switch horizontal is connected to a corresponding horizontal in a distinct intermediate switch. Likewise, each intermediate switch vertical path is linked to a corresponding horizontal path in a distinct output switch.

With the flexibility provided by the intermediate stage in the switching network, a communication line terminating in a particular input switch has access to a communication line terminated in a particular output switch via any one of the intermediate stage switches S1—S$n$ having idle links between the particular input and output switches. Thus, for example, consider that the communication line represented by the line equipment IL0 desires a connection to the line represented by equipment OL*n*, the former being terminated in input switch I1 and the latter being terminated in output switch O1. The network control circuit proceeds to determine the availability of an intermediate switch S1—S*n* having available its links with both I1 and O1, considering of course that both input and output lines are presently idle.

If switch S1 satisfies these requirements, the connection will be completed from IL0 through vertical path O and horizontal path O of input switch I1, through horizontal path O and vertical path O of intermediate switch S1, and through horizontal path O and vertical path *n* of output switch O1 to the desired output line terminal OL*n*.

Of course since a number of lines IL0—IL*n* and OL0—OL*n* have access to the switches I1 and O1 simultaneously, the occasion may arise when line IL0 cannot be connected to the desired output line OL*n* due to the fact that one or both links between the respective intermediate switches S1—S*n* and each of the input switch I1 and the output switch O1 are serving other connections. In normal operation this network condition would be reflected to the input line by a busy signal and the connection lost. According to the instant invention, however, existing network connections may be rearranged by breaking one or more of the links and rerouting the disturbed connections through different intermediate switches.

Thus, for example, a call established between input switch I1 and output switch O1 through intermediate switch S2 may be contributing to the blocking condition of a potential connection involving another line connected to input switch I1. The blocked condition may be removed by merely transferring the prior connection from intermediate switch S2 to another intermediate switch, for example, S1, so that the prior connection is undisturbed at its terminal switches I1 and O1 but now includes intermediate switch S1 rather than S2. In this fashion the link between I1 and S2 and the link between S2 and O1 are now free to accommodate the desired potential connection of I1 and O1.

The manner in which the cross connections are established in the switching network is well known in the art; i.e., utilizing the identity of the input and output lines to be connected to activate the particular horizontal and vertical paths in each switch involved in a connection. Thus each vertical path in the input and output switches is controlled by a corresponding flip-flop circuit IV0—IV*n* and OV0—OV*n*. Similarly, the individual input and output switches are controlled by flip-flop circuits IS0—IS*n* and OS0—OS*n*. In this fashion the particular vertical path and the input or output switch corresponding to a particular line may be identified. Also the combination of flip-flops SS0—SS*n* and horizontal gate circuits HG1 and HG2 further identifies a particular intermediate switch to be associated with an input and an output switch to complete a connection through the network.

Network control 100 registers indications of the switch and vertical locations of the calling and called lines and determines the desired intermediate switch for completing the connection through the network. The devices indicated by rectangles 10 and 11, designated input line identity and output line identity, respectively, do not constitute an essential part of the present disclosure but are ancillary thereto and are shown merely to indicate a suitable source of calling and called line identifying indicia to be supplied to the network control 100. Thus rectangles 10 and 11 represent any suitable device well known in the communications art for providing calling and called line identifying indicia in a form suitable for registration. The network control 100 receives this information, compares it with the state of the switching network as stored therein, and provides similar identification of input, intermediate and output switches in the form of orders to the control circuit 12 to either establish or disestablish network connections.

A more detailed analysis of the manner in which input and output line designations received from external equipment may be utilized to establish or disestablish a network connection is set forth in the cited Zarouni patent application referred to hereinafter as "Zarouni." The intermediate switch connections in Zarouni are effected upon completion of a scanning routine which is utilized therein to determine available intermediate switches. In the instant case such information is supplied directly to the control circuit by the network control so that the scanning operation is circumvented. The manner for such circumvention and completion of the intermediate switch connections is apparent from consideration of the cited Zarouni application.

The instant circuit also requires indications as to when a desired operation has been completed and a connection established or disestablished. This information is also available in Zarouni, as indicated by the presence of ground on the sleeve leads of connected input or output lines, which ground may be readily extended through the switches to the network control 100. Removal of such ground of course indicates that a disconnect has been effected.

Thus all of the information essential to the operation of the network control 100 in accordance with this invention, in order to operate the switching network, may be derived from the circuitry disclosed in Zarouni, and the instant disclosure hereinafter will be confined to the content and manner of operation of the network control 100 itself.

*Network Control*

Referring now to FIGS. 2 and 3 of the drawing, a schematic diagram in block form of one specific illustrative embodiment of the network control 100 in accordance with this invention is shown. As there depicted, the circuit contains an output network memory 110 and an input network memory 120, each of which comprises a matrix of memory elements familiar to the art; e.g., magnetic cores. The elements are accessible on a coincident current basis for purposes of writing new information in the memory or reading information nondestructively from the memory. Such a memory is disclosed, for example, in "Digital Computer Components and Circuits" by R. K. Richards, D. Van Nostrand Company, Inc., 1957, page 388, FIG. 8–15, and page 393, referred to hereinafter as "Richards."

Considering memory 110, the coordinate access circuits 111 and 112 comprising suitable devices for translating the identity of an input switch and an intermediate switch, respectively, activate a predetermined discrete element of the memory 110 in a distinct time interval. Dependent upon which output register 113 or input register 114 is activated in the same time interval, information is respectively read from or written in the discrete memory element. Memory 120 acts in similar fashion to store input switch designations in response to output and intermediate switch access designations.

Each discrete memory element has the capacity to store a plurality of binary digits forming a word representing a particular line identity. Thus the memory is said to be word organized, as known in the art, and disclosed, for example, in Richards, page 33, FIG. 8–5. Input, output and access circuitry suitable for the memory circuits in this embodiment of the invention are also described in Richards, page 57, FIG. 2–12.

The memories 110 and 120 serve as an instantaneous record of the network condition. As each new connection is completed through the network, the particular output switch involved in the connection is recorded in the memory 110 at a point which is accessible from the particular input and intermediate switch indications also involved in the connection. For example, in order to ascertain the identity of an output switch involved in a particular connection, the designation of the input switch engaged in the same connection will be applied to the access circuit 111 and the designation of the intermediate switch involved in the same connection will be applied to the access circuit 112. The translation as effected in these access circuits will activate a particular set of coordinate leads at the crosspoint of which the desired output switch identity will be found. In similar fashion the identity of a particular input switch may be stored or removed from a discrete location in the input network memory 120, access in this instance being effected by application of the identity of the output switch and intermediate switch involved in the connection through the network.

Interrogation of these memories for purposes of reading out the switch identity stored at a particular location will not destroy the stored information. Such destructive action can only be taken by the writing of new information in the same discrete location. The memories thus are considered to have the property of nondestructive readout.

An indication of the typical content of these memories is provided by the networks depicted in FIGS. 5 and 6. Thus a memory, restricted for purposes of illustration to a 3 x 3 matrix having nine possible storage areas, will reflect the condition at any moment of a corresponding switching network having three input, three intermediate, and three output switches. For the output network memory 110, FIG. 5, input switch designations are applied to the access circuit 111 where they are translated into indications directing signals to the particular desired column I1, I2 or I3. Concurrently the designation of a particular one of the intermediate switches S1, S2 or S3 is translated in access circuit 112 into a signal directed to one of the three rows of the memory 110. At the selected crosspoint of the activated row and column will be stored the designation of the particular output switch involved in the connection under scrutiny. Thus in the example illustrated in FIG. 5, a designation of output switch O1 is stored at the intersection of the first column, designated I1, and the first row, designated S1. This indicates that an active network connection involving input switch I1 and intermediate switch S1 also includes output switch O1.

Also recorded in the network memories are indications of the particular active lines connected to the output or input switches. These lines are designated as distinct levels in the corresponding switch. Thus on the instant connection, for example, the designation O1, level 1, refers to the line connected to the first vertical path or level in the output switch O1. The active input line on this connection may be determined from the input network memory 120. Thus at the intersection of O1 and S1, the other two switches involved in the connection, is found input switch I1, level 2. The complete connection is thus I1, level 2, S1—O1, level 1.

Availability of this map of the network condition permits the network control 100 to seek out an available path through the network for a potential connection and, if one is not available, to determine the possibility of rearranging existing connections in the network to free a path for the potential connection.

The output and input registers 113 and 114 and 123 and 124, FIG. 2, may comprise temporary storage means such as a series of flip-flops, as well known in the art and shown, for example, in Richards, page 73, FIGS. 3–4, which receive binary indications in parallel form, store the indications until new indications are received, and release the indications nondestructively upon command. The operation is such that the digital form of the signals may be retained throughout the various transfer operations involved in this circuit.

Similar circuitry is included in the output change memory 130 and input change memory 140, together with their access circuits 132 and 142, respectively, and the input and output registers 131, 133 and 141, 143, respectively. The memory units are similar in composition to the network memories 110 and 120 but in this instance, as indicated in FIGS. 8 and 9, these memories are addressed only to particular rows of the matrix, so that one designation of a switch appears in each row; viz., the identity of a particular input line will be stored in a corresponding row of the input change memory 140 and the identity of a particular output line will be stored in a corresponding row of the output change memory 130, such information being received through the respective input registers 131 and 141.

It is this stored information which is later utilized to gain access to a particular column in one of the network memories 110 and 120 through the change memory output registers 133 and 143. Again the registers and access circuitry involve components familiar to the art, corresponding to those employed in connection with the network memories.

The final memory unit employed in the network control 100 is the order memory 150 which is also similar in composition to the network memories 110 and 120 with coordinate access from access circuits 152 and 153 to permit storage of information received through the input register 151 at discrete crosspoints of the memory matrix. Upon receipt of appropriate signals, such stored information may be read out of the order memory 150 to output register 155, and from there it may control the operation of the balance of the network control 100 and of the switching network control circuit 12 to establish or take down particular network connections.

The access circuit 153 receives its directions from a counter circuit 154 which may be a simple ring counter familiar to the art, as shown for example in Richards, page 89, FIGS. 3–9, comprising a series of flip-flop units for progressively increasing the count registered therein on receipt of a sequence of signals from the clock generator and gate control 170. The access circuit 152 also receives its input signals at discrete time intervals under control of the clock generator and gate control 170.

The clock generator and gate control circuit 170 includes a synchronous pulse generator or clock as is known in the art which generates consecutive timed clock pulses. These pulses are applied on the designated t leads to each of the circuits shown in block form in the network control 100, FIGS. 2 and 3. Upon the coincidence of the clock signal with another input, as determined by the network control operation, each of the circuits will perform its allotted function. Thus, for example, when information is to be stored in the input change memory 140, the clock pulse combines with the input line identity on lead 145 to record the line identity in the input register 141. At the next appearance of a clock pulse the information stored in the input register 141 may be transferred to the input change memory 140 in accordance with a routine gating operation familiar to the art. The particular sequence of such transfer operations as performed by the network control 100 under direction of clock pulses from the clock generator and gate control 170 will be considered in detail in the description of the state diagrams of FIGS. 15 through 24.

Other circuitry incorporated in the network control 100 includes the counter 101 which may also be a conventional ring counter as known in the art. Operating in conjunction with the counter 101 are the count registers 102 and 103, the save register 104, and the state register 105. Again these registers incorporate flip-flop circuits in the same fashion as the input and output registers with the exception of the save register 104 which also acts as a ring counter after the fashion of counter 101.

The remaining circuits in the network control 100 include the logic 160 and the comparison circuit 180. Both of these circuits perform a type of logic comparison and are illustrated in greater detail in FIGS. 10 and 11, respectively. Thus the logic 160 comprises AND gates, OR gate and inverters, themselves familiar logic components, symbolic and schematic circuits for which are disclosed in FIGS. 12B, 13B and 14B, respectively. Such circuits are described in Richards, page 38, FIG. 2-1 and page 67, FIG. 3-1. Switch designations are received in parallel form at the OR gates over leads 161 and 162. The logic 160 is only interested in the presence or absence of a switch designation at each of its inputs. Thus if an output switch designation appears on input 161, the OR gate 163 will provide an output which will be directed to lead C, to AND gate 167 and to inverter 165. If at the same time an input switch designation appears on input 162, OR gate 164 will provide an output to lead G, AND gate 169 and inverter 166. The result of the inversion in circuits 165 and 166 determines that AND gates 167 and 169 will fail to provide outputs, but AND gate 168, receiving like signals at both its inputs, will provide an output on lead E. Thus the concurrent presence of both input and output switch indications at the respective inputs of logic 160 will result in output signals appearing on leads C, E and G.

In similar fashion it may be shown that the absence of both output and input switch designations on leads 161 and 162, respectively, will produce an output only on lead E; and output switch designation absent an input switch designation will result in outputs on leads C and D; and an input switch designation absent an output switch designation will provide outputs on leads F and G. The employment of the particular outputs at any given time will be considered in conjunction with the state diagram description of the network control operation illustrated in the state diagrams, FIGS. 15 through 24.

Comparator 180 is a simple logic circuit including AND, OR and inverter circuits which receives input and output switch and level designations in parallel form and determines whether or not they are identical. If not, one or more of the AND gates will fail to provide an output signal so that one or more of the inverter circuits will deliver a signal through the final OR gate to signal the failure of the comparator 180 to register identical inputs.

External signals utilized by the network control 100 are the identity of the input and output lines which are received from external circuitry not a part of this invention in a form suitably representing the corresponding input or output switches and levels. When a connection has been completed in the network in accordance with this input and output line identity information, the identity of the activated input, intermediate and output switches is returned over the identity leads to the network control 100 for verification and recording.

All operations of the network control 100 are performed in accordance with the condition of the request lead 171 which is active any time an unsatisfied request for a connection is present. When a request is satisfied, a signal is transmitted over the request served lead 172. Also direct orders for operation of particular switches in the network are delivered from the output register 155 to the switching network control circuit 12 to facilitate establishment or disestablishment of network connections as required.

The complete operation of the network control 100 under various operating conditions as generated by particular requests for service and switching network conditions will be understood more readily from the following description in conjunction with the state diagrams or operation flow charts illustrated in FIGS. 15 through 24.

*Establishing a Connection*

The network control 100 is prepared at any instant to receive requests to perform various functions including the establishment of a connection, the recording of an established connection, the releasing and recording of connections to overcome a blocking condition, and the disconnection of established connections. The clock generator and gate control 170 applies a regular sequence of activating signals to the gate circuits serving the various access and memory devices in the control 100. Thus in state 1, FIG. 17, a signal received on lead 171, FIG. 2, advances the operation in conjunction with a clock signal to place the network control 100 in state 2. The signal on lead 171 is of a distinctive nature, indicating to the control circuit 170 that it represents a request to establish or put up a call connection.

In state 2 the counter 101 is prepared to apply a signal to the access circuits 132 and 142 indicative of the number one stored therein representing intermediate switch S1. Concurrently, the designations of the particular output and input switches and levels in those switches to which the calling and called parties are connected are applied to the input registers 131 and 141. Thereupon the switch and level designations are written in the first position of the corresponding change memories 130 and 140. Consider, for example, that the input line connected to input switch I1, level 2, desires connection to the output line connected to output switch O1, level 1. Thus position 1 of the change memory 130, FIG. 8, will store the designation O1, level 1, and the first position of the input change memory 140, FIG. 9, will store the designation I1, level 2.

It is now the function of the network control 100 to determine the content of the network memories 110 and 120 and assign a middle switch which is free to serve this call. Thus in state 3, FIG. 17, the counter 101 in position 1 again activates the access circuits 132 and 142, this time to read out the first positions of the change memories 130 and 140, respectively, into the corresponding output registers 133 and 143.

As this is a request for a new connection controlled by the unique request signal on lead 171, the operation is advanced to state 4a, at which time the output register 133 applies its content to access circuit 121 and the output register 143 applies its content to the access circuit 111. Concurrently, the counter 101 in its first position serves to address the S1 position of each of the network memories 110 and 120 through the respective access circuits 112 and 122. The content of output network memory 110 at the position defined by the coordinates S1 and I1 is thereafter read out to the output register 113.

Since we are here concerned with the establishment of a simple connection, it is assumed that the network is not blocked. Therefore, the network memory 100 at this crosspoint will be vacant and the operation will advance to state 5, with the output registers 113 and 123 applying 0 or vacant indications to the respective input leads 161 and 162 of the logic circuit 160, FIG. 10. The 0 or vacant indications on both input leads cause the logic circuit 160 to provide an output on lead E which serves to advance the operation of state 8, FIG. 17. The counter 101 in state 8 applies an indication of its first position to the count register 102, and the operation is advanced to state 34, FIG. 22, in which condition an "UP" signal, referring to an order to set up a connection, is applied by the state register 105 to the input 151 of the order memory 150. At the same time an up/down indication is applied to the access circuit 152 by the clock generator and gate control 170, such that with the order memory counter 154 in its first position, the order memory 150 will record the "UP" order in the up/down position of its first line, FIG. 7.

In state 36 the content (1) of the count register 102 is applied to the order memory input register 151 concurrently with the application of the intermediate switch access designation to the order memory access circuit 152, such that with the next clock pulse, intermediate switch S1 is recorded in the intermediate switch position of line 1 of the order memory 150.

In state 38 the content of the change memory output register 143, I1, level 2, is recorded in the input switch position of line 1 of the order memory 150, and since the counter 101 is in its first position, the operation advances to state 45, FIG. 23. Here the operation is repeated for the desired output switch designation O1, level 1, which designation is thereupon recorded in the output switch position of line 1 of the order memory 150. Thus the order memory 150 now contains the order to put up the connection I1, level 2, S1—O1, level 1.

Subsequent operations in accordance with the state diagram; viz., states 48 through 58, FIGS. 23 and 24, are concerned primarily with conditions arising from a block condition in which network connections must be taken down and rearranged in order to complete a request for a new connection. Such an operation will be discussed subsequently. For present purposes, however, in order to complete a connection through the network in which no blocking condition is encountered, the operation merely progresses through states 48, 49, 54 and 58, the orders for the complete connection being established in the output register 155 and the switching network being alerted to act accordingly in state 58. The network control 100 is advised of the task completion by the receipt on the request lead 171 of an appropriate indication. With such an appropriate acknowledgement, the network control proceeds to reset all counters to the first position and restore itself otherwise to the state 1 condition in readiness for a new request for service.

Recapitulating the actions taken by the network control 100, a connection request was received, the network memories were interrogated to determine the availability of an intermediate switch having its links to both of the incoming and outgoing switches involved in the request free to complete connection. Having determined that the first intermediate switch tested was available by virtue of the fact that nothing was recorded in either network memory at the appropriate locations, the order to establish the connection was written in the order memory and made available to the switching network through the order memory output register.

*Blocked Connection*

Assume that it is desired to connect the line at level 1 of input switch I1 to the line at level 2 of output switch O2 and that the connection shown in FIG. 4A have been previously established in the network; viz., I1, level 2—S1—O1, level 1; I1, level 3—S3—O3, level 2; I2, level 2—S2—O2, level 1; and I2, level 3—S3—O1, level 2 are established connections. Thus S2 is the only intermediate switch available to input switch I1 for establishment of the desired connection, and since the link S2—O2 is occupied, the desired connection of input switch I1 to output switch O2 is blocked.

In order to provide a path through the network for the desired connection, the existing network connections in accordance with this invention must be modified, and such modification is accomplished in the network control 100, FIGS. 2 and 3. Initially the network memories 110 and 120 have stored therein the existing network connections. Thus, as illustrated in FIG. 5, the output network memory 110 has stored therein all active output switches and levels, access to such information being attained by the application of the intermediate switch identification at one coordinate and the input switch identification at the opposite coordinate. For example, the output switch and level presently active on the connection including input switch I1 and intermediate switch S1 is found at the coordinate crosspoint of the intermediate switch address S1 and the input switch address I1. The information stored in this position, FIG. 5, is output switch O1, level 1 which conforms to the established network connection I1, level 2—S1—O1, level 1 designated in FIG. 4A.

In similar fashion it may be seen in FIG. 6 that the input switch information stored in input network memory 120 may be interrogated by the address of the intermediate switch in one coordinate and the output switch in the opposite coordinate. For the established connection of this example, interrogation of the input network memory 120 by intermediate switch S1 and output switch O1 produces the stored information; viz., input switch I1, level 2.

The control 100 first determines the condition of all possible connections through the network between the desired input and output switches as in the case of an available network path for a potential call discussed hereinbefore. Once having established that such a path is not available, the control 100 calls into service the change memories 130 and 140 and the order memory 150 to maintain a record of existing connections which may be readily interchanged in order to free a path through the network for the potential call.

The state diagrams in FIGS. 16 through 24 indicate the manner of operation of the network control 100 when presented with a request to complete a network connection when in fact such a connection is blocked by existing connections. Beginning in position 1, FIG. 17, the request to establish a connection is received in the registers 131 and 141 having access to the corresponding change memories 130 and 140. In the same clock interval, as indicated at state 2, the counter 101 in position 1 provides an indication of this position to access circuits 132 and 142 of the corresponding change memories 130 and 140.

During the next clock interval the access circuits 132 and 142 are activated so as to store in position 1 of the output change memory 130, FIG. 8, the identity of the output switch and level involved in the request for a connection; viz., O2, level 2. Similarly, the input change memory 140 records input switch I1, level 1 in its first position, FIG. 9. The information so recorded is read out during the next clock interval into registers 133 and 143; viz., O2, level 2 is recorded in register 133 and I1, level 1 is recorded in register 143.

In state 4 the signal on the request lead 171 indicating a desired connection directs the progress to state 4a, in which state the switch information recorded in change output register 133 is gated to access circuit 121 and the switch information recorded in change output register 143 is gated to access circuit 111. Thus access circuit 111 receives the designation of switch I1 and access circuit 121 receives the designation of switch O2. Simultaneously the counter 101 has its present position 1 gated to the access circuits 112 and 122. At the next clock interval the information recorded in the position in each network memory designated by the coordinate access information is read out. Thus output network memory 110 will have gated to output register 113 the information O1, level 1 recorded at the crosspoint of coordinates S1, designated by the access circuit 112, and I1, designated by the access circuit 111. The input network memory 120 will have gated to the output register 123 the information (in this instance an indication of available space) recorded at the crosspoint of coordinates S1, designated by the access circuit 122, and O2, designated by the access circuit 121.

The logic circuit 160 receives a distinct signal from register 113 when information is stored therein indicating a specific switch designation. In this instance, since such information is available in register 123, the logic 160 will receive the distinct signal over lead 162. Register 123 has no switch information stored therein so that the distinct signal will not be available on lead 161 to logic 160.

Advancing to state 5, the next clock pulse activates the logic circuit together with the inputs from the registers 113 and 123, respectively, such that in this instance outputs from the logic are $D=1$, $E=0$ and $F=0$. This combination of outputs, together with the next clock pulse, will advance the operation to state 6 in which the condition of counter 101 will be recorded in count register 102. Advancing through state 9, the gate control circuit 170 receives an indication that the counter 101 is not at the maximum count $n=3$ and thus advances with the next clock pulse to state 10.

At this point the counter 101 is advanced to position 2, and the operation in state 4a is repeated. In this instance, however, with the counter in position 2, the network memories are addressed in the second level. Thus the information read out of memory 110 is that stored at the crosspoint of coordinates S2, designated by the access circuit 112, and I1, designated by the access circuit 111, which storage area in this instance is empty. Thus the distinct output signal is not present on lead 161 at this time. Similarly, the information stored at the crosspoint of coordinates S2 and O2 is read from the network memory 120 and stored in the output register 123. Since this storage area contains the information I2, level 2, the distinct signal is transmitted to logic 160 over lead 162. The combination is these input signals, together with the next clock signal in state 5, provides logic 160 outputs $D=0$, $E=0$ and $F=1$, which condition serves to advance the operation to state 7.

The next signal from clock 171 causes the counter 101 to read out a designation of its present second position and write it in count register 103. Since the counter is not yet in its third or $n$ position, the operation performed in states 10, 4a and 5 are again repeated. Thus the counter 101 is advanced to its third and last position, the network memories 110 and 120 are read out at coordinate positions S3, I1 and S3, O2, respectively. The former position stores a switch designation; the latter does not. The logic 160 responds to the corresponding input signals to again advance the operation to state 6 where the present counter 101 position 3 is recorded in count register 102, replacing the priorly recorded position 1. Having now reached the final position for the counter 101, the operation will be advanced to state 14, FIG. 18, and the counter 101 reset to its first position.

In recapitulation of the blocked connection operation to this point, the designations of the input and output swtiches desiring connection were recorded in the first position of the corresponding change memories 130 and 140, and the successive readout of the content of network memories 110 and 120, reflecting every possible link for serving this connection, failed to reveal an available path, thereby resulting in the storage in the count registers 102 and 103, positions 3 and 2, respectively, of the counter 101 corresponding to intermediate switches 3 and 2.

In state 14 the counter designation 3 stored in register 102 is written in the access circuit 112 and the counter designation 2 stored in the register 103 is written in the access circuit 122. The content of the access circuits 111 and 121 remains unchanged such that the new address for the network memory 110 is C(3), I1 and of the network memory 120, (B(2), O2.

At the next clock signal the content of the network memories 110 and 120 at these coordinates is read out. Thus output register 113 will now contain the designation for output switch O3, level 2 and output register 123 will contain the designation for input switch I2, level 2. With information in both output registers 113 and 123, the logic 160 in state 15 will receive signals indicative of the stored switch designations on both input leads 161 and 162. In state 15 the gate control circuit 170 is interested in the outputs on leads C and G of the logic 160, and in this instance both of these leads are active so that the operation advances to state 16. Also the counter 101 is advanced to position 2.

In state 16 the content of the network memory output register 113 (O3, level 2) is written in the change memory input register 131. Similarly, the content of the network memory output register 123 (I2, level 2) is written in the change memory input register 141. Concurrently, a representation of the present counter 101 position (2) is recorded in the change memory access circuits 132 and 142. Succeeding clock pulses advancing the operation through state 17 cause the information stored in the change memory input registers 131 and 141 to be recorded in the second position of the corresponding change memories 130 and 140, respectively. This condition is reflected in FIGS. 8 and 9. Having stored this information in the change memories, it is immediately written in the corresponding output registers 133 and 143.

Figure 18:
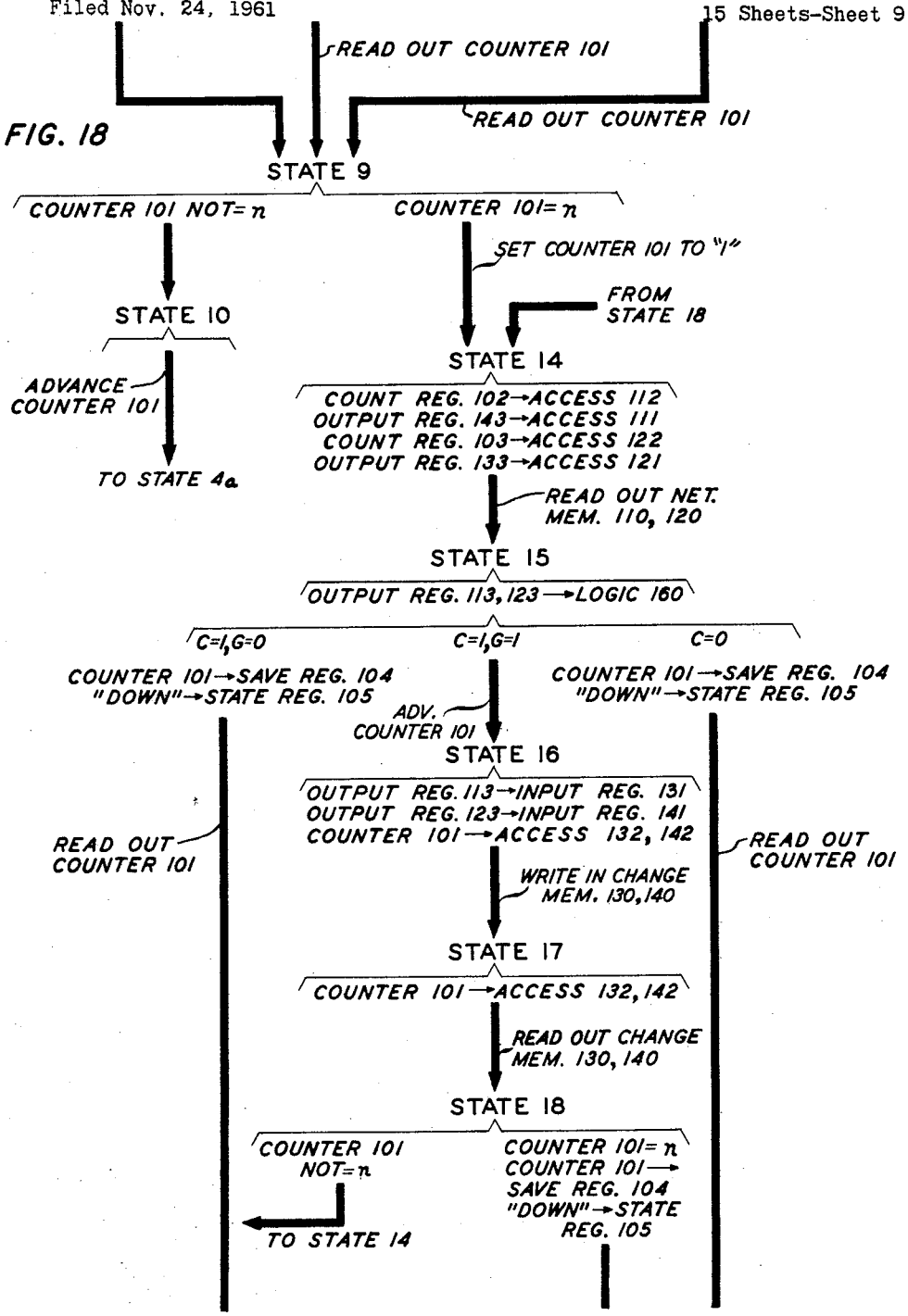
Figure 19:
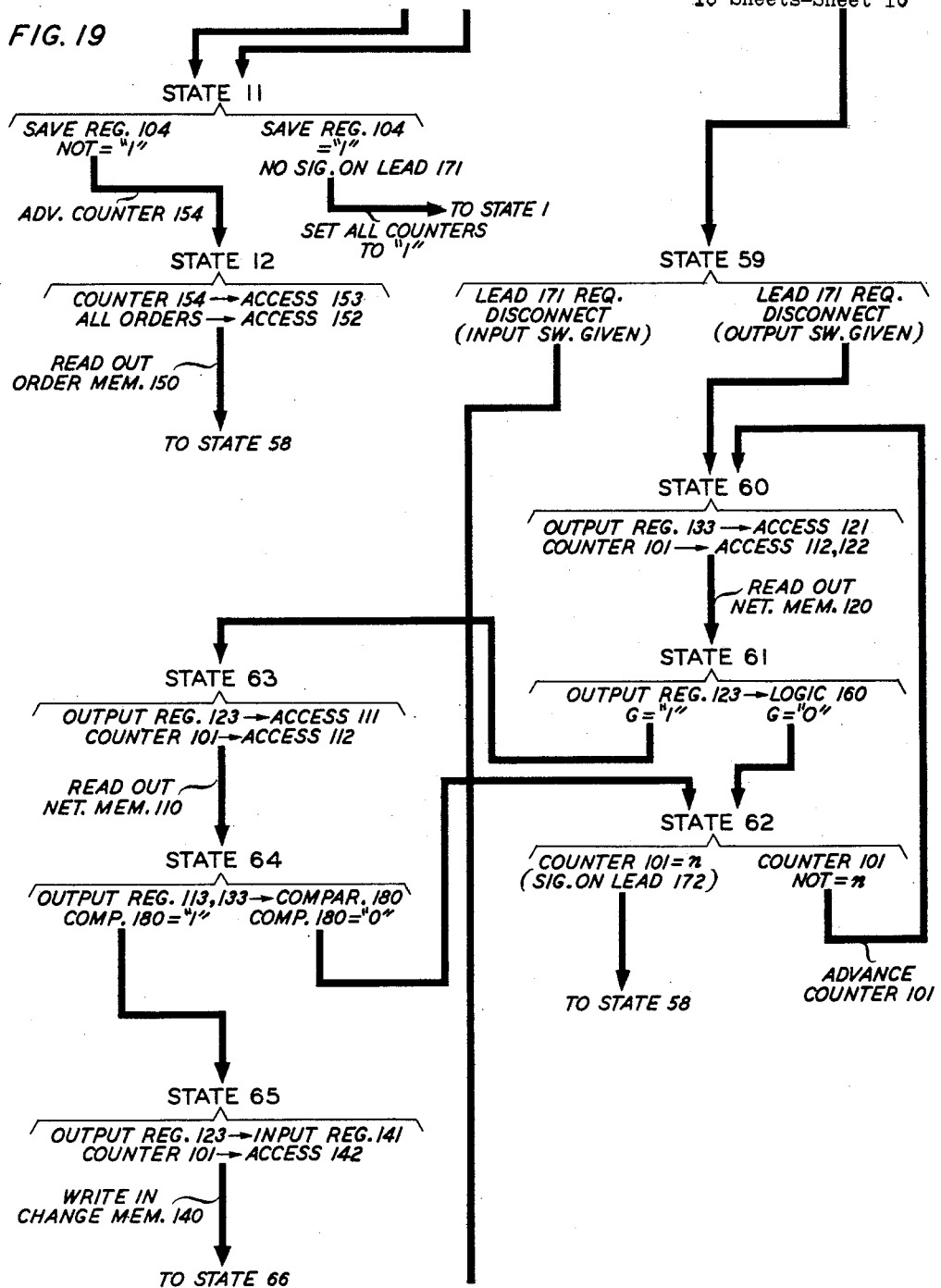
Figure 20:
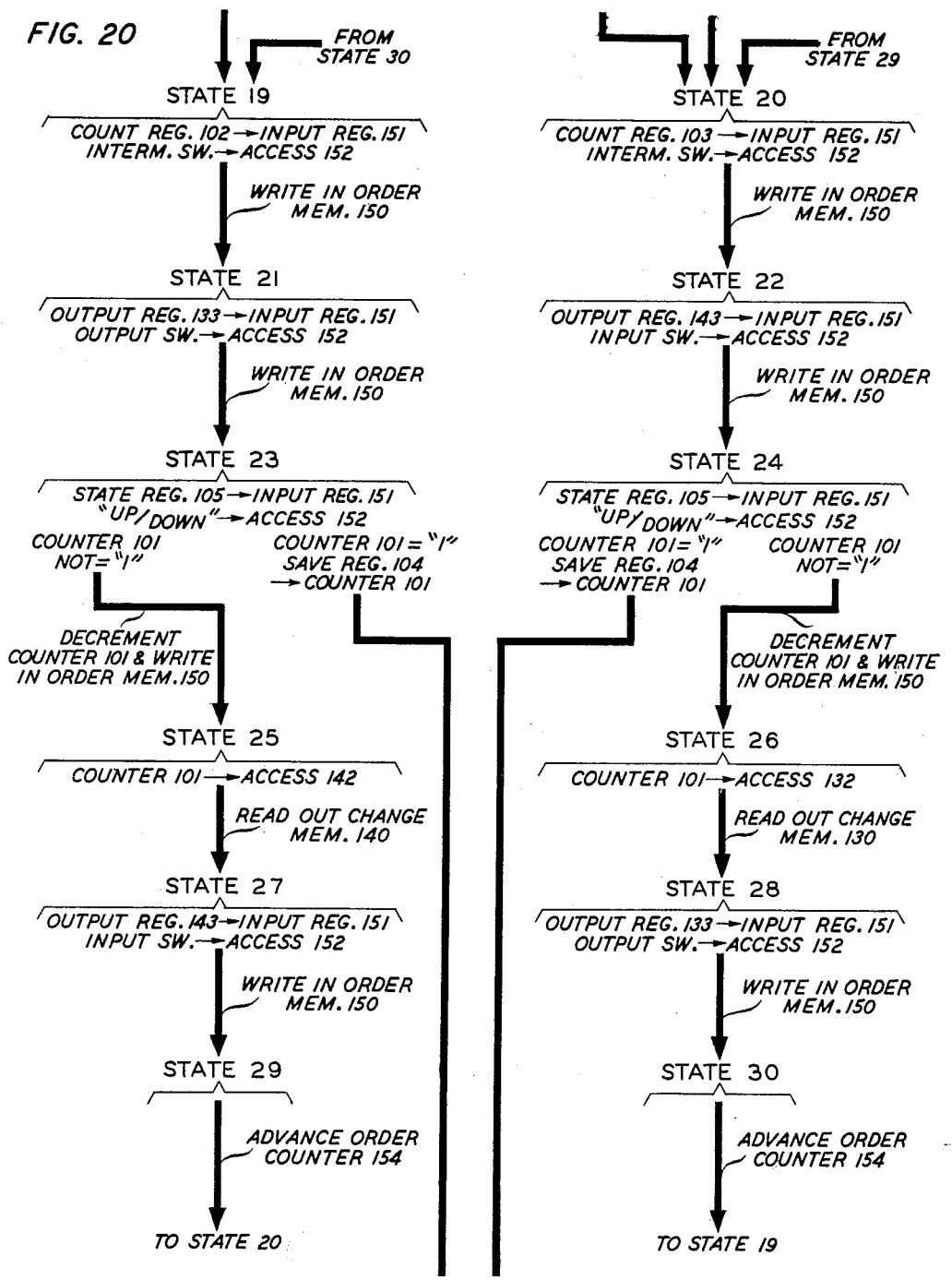
Figure 21:
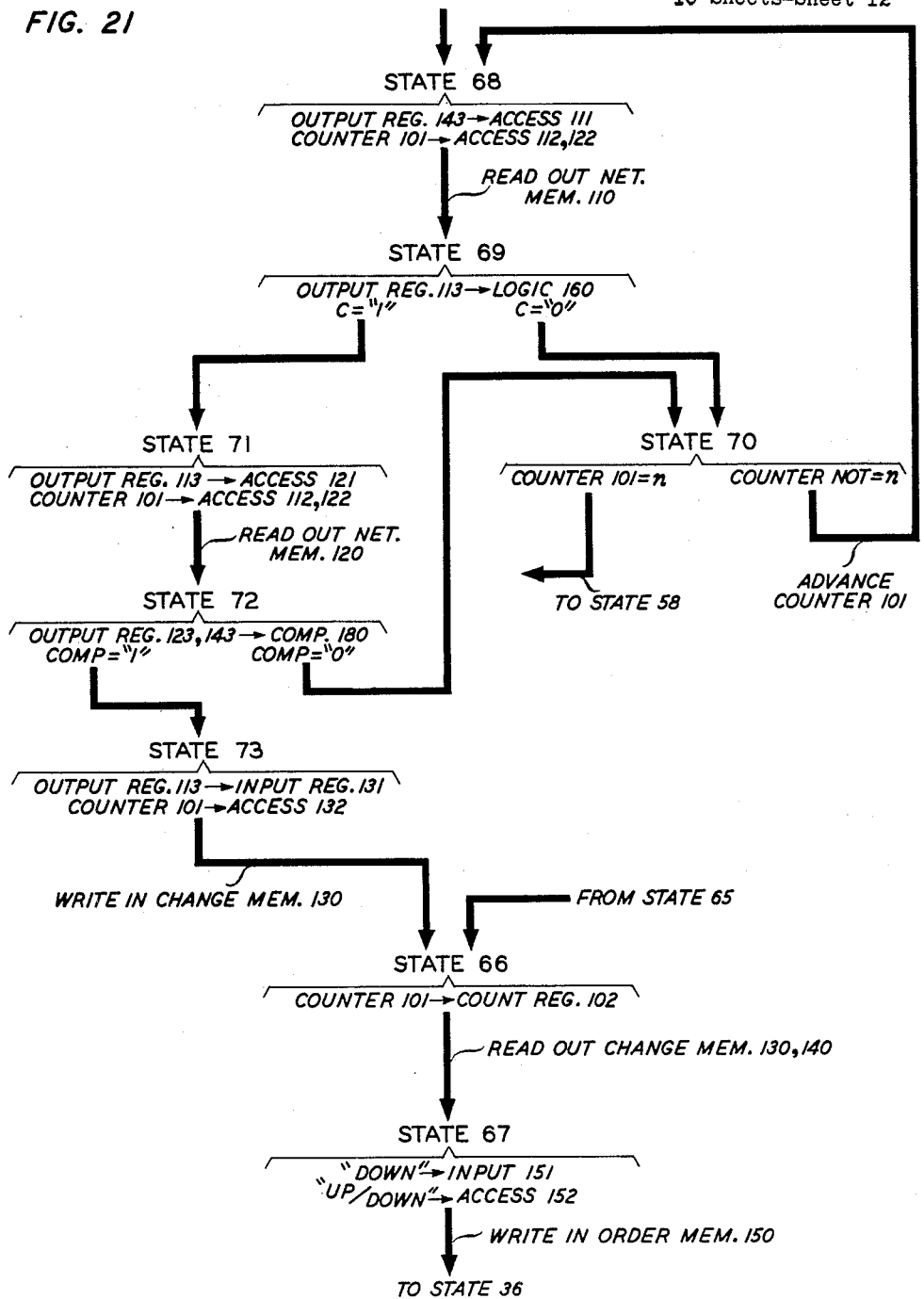
Figure 22:
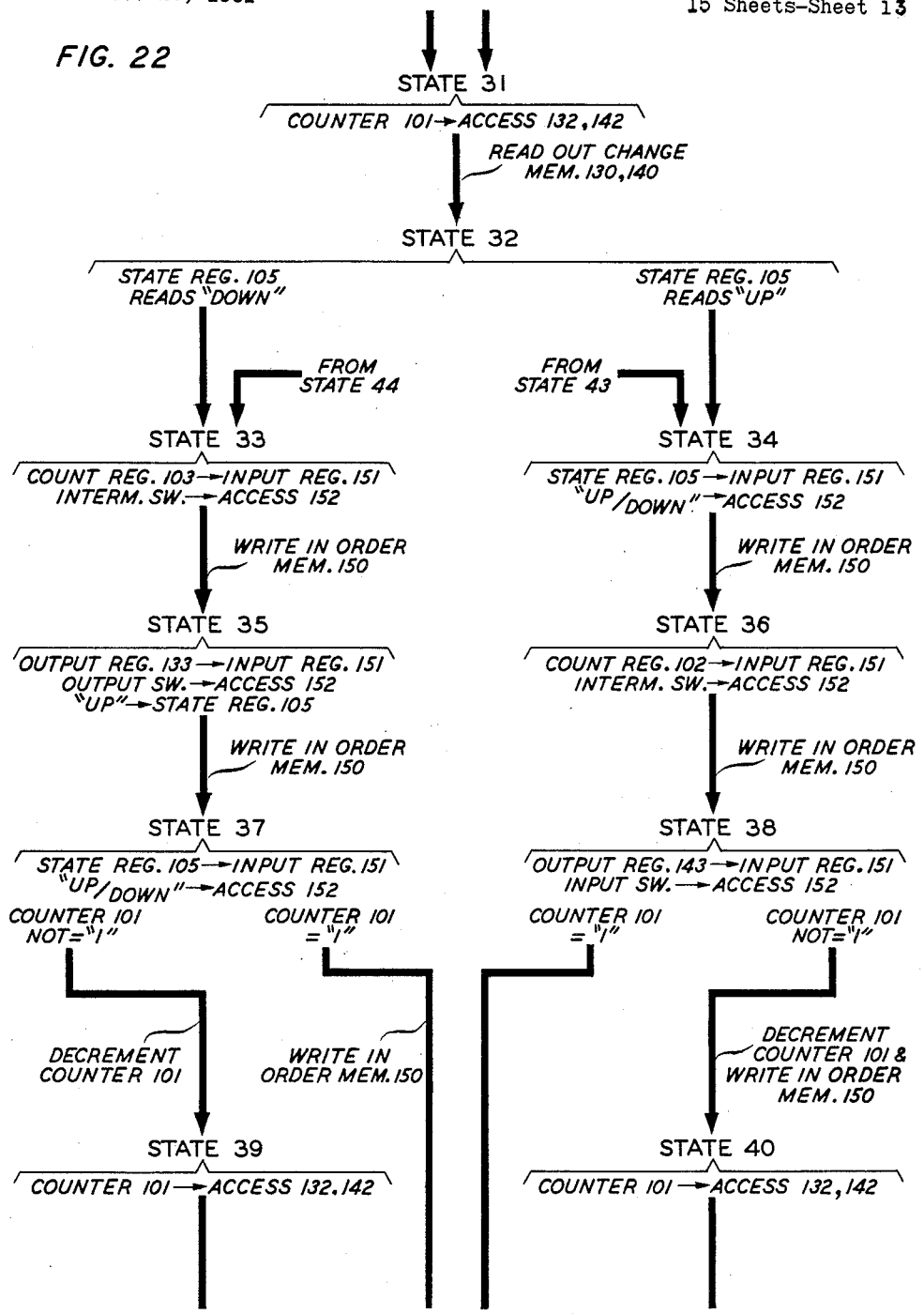

In state 18, FIG. 18, the circuit recognizes that the counter 101 is not in its third and final position and thus repeats the operation performed in state 14. The network memories 110 and 120 receive the same address from access circuits 112 and 122, respectively, but the opposite coordinate address is altered in each instance. Thus access circuit 111 now receives the designation I2, so that the crosspoint addressed in network memory 110 is now S3, I2 and the information O2, level 2 stored in this position is written in the output register 113.

Similarly, the network memory 120 is addressed to the crosspoint storage area at coordinates S2, O3, which area is currently vacant, and reflects this storage area's content to the output register 123. The logic circuit 160 responds to this condition of the network output registers by providing an output on its C lead but not on its G lead. This serves to advance the operation to state 19. At the same time the counter 101 records its present position (2) in the save register 104, and state register 105 is placed in the DOWN condition by the control circuit 170. The purpose of these registrations will be clarified hereinafter.

Another brief recapitulation indicates that the change memories 130 and 140 have now recorded information in the first and second positions thereof, the former reflecting the input and output switches desiring connection and the latter reflecting existing network connections as recorded in the network memories 110 and 120.

The circuit is now prepared to store in the order memory 150 designations of particular paths through the switching network and the manner for their alteration in order to provide a path for establishment of the desired connection. Thus in state 19 the content of count register 102 (3) is written in order input register 151, and the intermediate switch control lead in order access circuit 152 is activated. The order counter 154 is in its first position, such that order access circuit 153 addresses the first line or level of the memory 150. Thereafter, as best seen in FIG. 7, the designation S3, corresponding to the appropriate intermidate switch, is stored in the intermediate switch storage area of the first line or order memory 150.

In state 21 the content of the change memory output register 133 (O3, level 2) is written in the output switch storage area of line 1 in the order memory 150, and in state 23 the DOWN signal stored in state register 105, indicating that a connection should be taken down, is registered in the up/down position in line 1 of the order memory 150. Since the counter 101 is in position 2 it is decremented at this time; viz., restored to its first position from the current sceond position, and in state 25 this first counter position is gated to access circuit 142, such that the change memory 140 will be addressed to its first position and the content thereof (I1, level 1) recorded in the input switch position of line 1 of order memory 150.

Thus in state 27 the order memory 150 has recorded in the first line a complete switch connection from input switch I1, level 1 through intermediate switch S3 to output switch O3, level 2, coupled with a command to take this connection down.

In state 29 the order counter 154 is advanced to its second position so that succeeding functions will cause the storage of a switch connection order in line 2 of the order memory 150. The operation advances to state 20 in which the designation (2) stored in the count register 103 is written in the intermediate switch storage area in the second line of order memory 150. This designation corresponds to the intermediate switch S2 of FIG. 1.

In state 22 the content of change memory output register 143 (I1, level 1) is written in the input switch storage area in line 2 of the order memory 150. In state 24 the DOWN command in state register 105 is recorded in the up/down storage area in the second line of order memory 150. Since the counter 101 is in its first position at this time, this state (1) is altered by the content (2) of the save register 104, and the operation is advanced to state 31. The change memories 130 and 140 now read out their second position content to their respective output registers 133 and 143. Thus output register 133 now stores O3, level 2 and output register 143 stores I2, level 2.

At state 32 gate control 170 determines the content of the state register 105 to be a DOWN command in this instance and thus proceeds to state 33. The content of count register 103 (2) is written in the intermediate switch position of the second line of order memory 150. As the 2 or intermediate switch S2 representation was previously recorded in this position, no change is effected.

In state 35 the content of change memory output register 133 (O3, level 2) is recorded in the output switch position of the second line of order memory 150. The content of the state register 105 is then changed to reflect the "UP" order so that in state 37 the command previously stored in the up/down position of line 2 of the order memory 150 is changed from a DOWN order to an UP order. Thus, as shown in FIG. 7, a complete order has been stored in the second line of the order memory 150; viz., to put up the connection of input switch I1, level 1 to intermediate switch S2 to output switch O3, level 2.

Advancing now to state 39, the counter is once again decremented to position 1, which position designation is recorded in the change memory access circuits 132 and 142. Thus in state 41 the content of position 1 of change memory 140 is written in the input switch position of line 2 of the order memory 150. Again this information was prerecorded in this position, so that no change is effected. The order counter 154 advances the order memory 150 to line 3, and in state 34 an UP command is recorded in the up/down position of line 3 of the order memory 150.

In state 36 the designation of intermediate switch S3, stored in register 102 as counter position 3, is registered in the intermediate switch position of line 3 of order memory 150, and in state 38 the content of the change memory output register 143 (I1, level 1) is recorded in the input switch position of line 3 of the order memory 150. The counter 101 being in its first position, the operation now advances to state 46 in which the content of the change memory output register 133 (O2, level 2) is recorded in the output switch position of line 3 of order memory 150.

Thus as indicated in FIG. 7, a third order is established in the order memory 150; viz., put up a connection from input switch I1, level 1 to intermediate switch S3 to output switch O2, level 2. The orders are now complete except for the fact that the particular switch levels indicated may be incorrect, and it is necessary for the circuit to verify these orders by comparison of the stored information with that recorded in the network memories 110 and 120.

In preparation for the action taking place in state 48, the order counter 154 is restored to its first position. Then in state 48, line 1 of the order memory 150 is read out to the order output register 155. Line 1 of the order memory in this instance contains an order to take down a connection.

Thus the operation advances through state 49 to state 50 in which the output switch designation (O3) stored in the order output register 155 is gated to the network memrory access circuit 121. Similarly, the input switch designation (I1) is transferred to the network memory access circuit 111 and the intermediate switch designation S3 is transferred to the network memory access circuits 112 and 122. Thus the network memory 110 is addressed to the information stored at the crosspoint designated by the coordinate inputs I1 and S3. The information stored at this position is O3, level 2, which is subsequently transferred to the output register 113. Similarly, network memory 120 is addressed to O3 and S3 so that it will read out to the output register 123 the designation of input switch I1, level 3.

In state 52, with the order counter 154 set in position 1 so as to address line 1 of the order memory 150, the content of the output register 123 is transferred via the change memory 140 to the input switch position of the first line of the order memory 150. Thus as illustrated in FIG. 7, the information I1, level 1 currently stored in this position of the order memory 150 is replaced by I1, level 3. A similar operation is performed in state 51 for the output switch designation (O3, level 2), but in this instance no change in the information stored in order memory 150 is effected.

The operation now returns to state 48 with the order counter 154 advanced to position 2 so that the second line of the memory 150 is now interrogated and read out to the order output register 155. Since the order contained in the second line of the memory 150 is to put up a connection, the operation advances through state 49 to state 54, and the current position (2) of the order counter 154 is transferred to the save register 104. Also the counter 101 is restored to its first position.

With the save register 104 in the second position, the operation advances to state 55 in which the position of counter 101 (1) is registered in the order memory access circuit 153, and the order memory 150 position 1 is read out to the order output register 155. In state 56 the content of the input switch position of the first line of the order memory 150 (I1, level 3) is transferred from the order output register 155 to the order input register 151, and the input switch designation of access circuit 152 is activated. Thereafter, this input switch designation is written in the input switch position of line 2 of the order memory 150. A similar operation is performed on the output switch designation stored in line 2 of the order memory 150 in state 57.

The save counter 104 is then decremented to its first position, and the operation moves through state 54 to state 58, at which time the changes in network connections which must be effected in order to establish the current desired connection are now available in the order memory 150, FIG. 7, for execution. These connections and disconnections are effected in sequence in accordance with the normal switching network operation, being initiated by the transfer in state 58 of the first order from order output register 155 to switching network control circuit 12. Upon acknowledgment from the network as each order is satisfied; viz., the request lead 171 indicates the absence of a request, all counters in the network calculator are restored to their first positions, placing the circuit in the state 1 condition preparatory to receipt of the next service request.

Recapitulating the final orders executed by the switching network to effect an unblocking of the network to permit establishment of the current desired connection, the order memory contained in its first line the order to take down the existing connection of input switch I1, level 3 to intermediate switch S3 to output switch O3, level 2. This connection is indicated in the network map of FIG. 4A. Line 2 of the order memory 150 contained the order to put up the connection of input switch I1, level 3 to intermediate switch S2 to output switch O3, level 2. Thus the connection previously taken down is now reestablished through a different intermediate switch. Line 3 of the order memory 150 contains the order to put up the desired connection of input switch I1, level 1 through intermediate switch S3 to output switch O2, level 2. This is made possible by the availability of intermediate switch S3 upon the transfer of an existing connection from intermediate switch S3 to intermediate switch S2, as indicated in FIG. 4A.

*Recording Connections*

Upon establishment of each appropriate network connection, a signal is received over the request lead 171 indicating that the network control 100 should record the newly-established connection in the network memories 110 and 120. Thus in state 1 the appropriate request signal is transmitted, and in state 2 the particular designations of the input and output switches just connected to an intermediate switch are written in the first position of the respective output and input change memories 130 and 140. In state 3 this information is read out and recorded in the output registers 133 and 143, respectively. Subsequently, the equipment having recognized that this is a request to record information in the network memories as determined by the particular code received over request lead 171, the operation advances to state 4, FIGS. 16 and 17.

Consider, for example, that the connection to be recorded is "Put up the connection of input switch 1, level 3 to intermediate switch S2 to output switch O3 level 2." Thus the output register 133 will contain the output switch designation O3, level 2 and the output register 143 will contain the input switch designation I1, level 3. In state 4b to which the "record connect" signal directs the operation, the switch portion of these designations will be applied to the corresponding network memory access circuits 111 and 121. Simultaneously, the intermediate switch designation S2, available from the control circuit 12 on lead 173 at this time, will be applied to the access circuits 112 and 122. Also the output and input switch designations received from the appropriate control elements in the switching network are applied to the network memory input circuits 114 and 124, respectively. Thus the input register 114 will receive the designation O3, level 2 over leads 135 and 136 and the input register 124 will receive the designation I1, level 3 over leads 145 anod 146.

At the next clock signal the information available is read into the network memories; viz., output network memory 110 will store the designation of output switch O3, level 2 at the crosspoint of coordinates S2, I1, and the input network memory 120 will store the designation of input switch I1, level 3 at the crosspoint of coordinates S2, O3.

The operation now advances to state 11, and if the save register 104 reflects additional orders in the order memory 150 by having stored a count greater than 1, the counter 154 will be advanced so as to have access to the next line of the memory 150. Thereafter in state 12 the order memory 150 is addressed to the order in the next line, and its content read out to the output register 155. Again in state 58 the order stored in register 155 will be gated to the control circuit 12 to activate the switching network.

The operation then reverts to state 1, and the recording procedure is repeated. If in state 11 the save register 104 indicates by its stored count that only one order was contained in the memory 150, the operation immediately reverts to state 1 preparatory to receipt of the next request for service.

Recording Disconnections

Considering, now, that a disconnection was just acted upon; e.g. take down the connection of input switch I1, level 3 to intermediate switch S3 to output switch O3, level 2. In this instance the signal received from the network on lead 171 causes the operation to advance from state 4 to state 4c, in which state the output switch designation O3 in register 133 is gated to the access circuit 121, and the designation I1 in register 143 is applied to the access circuit 111. At the same time the intermediate switch designation S3 is applied to the access circuits 112 and 122 and a 0 or erase designation is applied to the input registers 114 and 124 by the clock generator and gate control 170.

The network memories 110 and 120 are then activated so as to erase the information stored at the crosspoints designated by the respective coordinate inputs; viz., output network memory 110 will erase the designation of out switch O3, level 2 recorded at the crosspoint of the coordinates S3, I1 and input network memory 120 will erase the designation of input switch I1, level 3 recorded at the crosspoint of the coordinates S3, O3. The operation is then advanced to state 11 preparatory to transmitting to the switching network the order stored in the next line of the order memory 150.

Request for Release

The network calculator 100 will respond to release of either input or output line to release the entire connection through the network. Consider, for example, that a connection exists between incoming switch I2, level 2—intermediate switch S2—output switch 2, level 1. A record of this connection, as indicated in FIG. 4A, will be available in the output and input network memories, as illustrated in FIGS. 5 and 6, respectively. Assume now that the line connected to output switch O2, level 1 is released. This change of state will be recognized in the network calculator 100 by the receipt of a request signal on lead 171 at the control and gating circuit 170 and by an identification of the output switch and level at the input 131.

At the outset the operation is the same as that performed for the establishment of a new call connection through the network. Thus in state 2, FIG. 17, the counter 101 in its first position applies a signal indicative of this status to the access circuits 132 and 142. Also any signal indicative of an input switch is recorded in the input register 141. In this instance, as the line terminating in the input switch has not yet been released, the indication will be 0. Thus the output switch information is written in the first position of the output change memory 130; viz., O2, level 1, while the input change memory 140 merely records the absence of any switch indication in position 1.

The network calculator 100 must now determine the input switch and level connected to the middle switch which in turn is connected to output switch 2, level 1 requesting disconnection. Thus in state 3 the counter 101 again applies the first position signal to the access circuits 132 and 142 and the respective change memories write the content of their first positions in the output registers 133 and 143, respectively. In state 4 the request for release on lead 171 is recognized, and the operation advances to state 59, FIG. 19. In state 59 the indication of the output switch, as stored in the output register 133, coupled with the disconnect request signal, advances the operation to state 60. At this point the content of the output register 133 (O2) is applied to the access circuit 121, and the first position of the counter 101 is applied to the access circuit 122. Thus the input network memory 120 is interrogated at the coordinates S1, O2 and its content, in this instance a blank, is written in the output register 123.

Absent a finite designation in the output register 123 in state 61, the logic 160 receives a corresponding indication on lead 162, such that the operation advances to state 62. With the counter in its first position, the operation returns to state 60, at which time the counter 101 advances to its second position. The operations in states 60 and 61 are repeated with the input network memory 120 now being interrogated at the coordinates S2, O2. The designation of input switch I2, level 2 recorded therein causes the operation to advance to state 63. The content of the output register 123 (I2) is now applied to the access circuit 111 of the output network memory 110 and the counter position 2 is applied to the access circuit 112. Thus the output network memory 110 is addressed to the S2, I2 storage area and the content, O2, level 1, is written in the output register 113.

In state 64 the contents of the output registers 113 and 133 are compared in the comparison circuit 180. In this instance the stored numbers are identical; viz., O2, level 1, so that the operation will be advanced to state 65. The network output registers 113 and 123 now apply their content, O2, level 1 and I2, level 2, respectively, to the input registers 131 and 141. The counter 101 records its second position in the access circuits 132 and 142, such that the desired switch designations are now stored in the second position of the respective change memories 130 and 140.

In state 66 the counter 101 records its second position in the count register 102, and the content of the change memories 130 and 140 is written in the output registers 133 and 143, respectively.

In state 67 the DOWN signal is applied to the input register 151, and the up/down indication is applied to the access circuit 152 such that the first line of the order memory 150 thereafter stores the DOWN order in the up/down position.

The operation now advances to state 36. The operations performed in states 36 through 44 correspond to those performed during the establishment of a connection; viz., the intermediate switch designation S2, corresponding to the second position of the counter 101, is recorded in the intermediate switch position of the first line of the order memory 150. Also the input and output switch designations stored in the change memory output registers 143 and 133, respectively, are written in the corresponding positions of the first line of the order memory 150. With a complete record of the switches involved in the connection to be released now contained in the first line of the order memory 150, the disconnect signal is again recognized, and the operation is advanced to state 58 at which point the content of the first line of the order memory 150 is written in the output register 155 and subsequently applied to the switching network.

Upon completion of this disconnect operation, the signal on the request lead 171 will be removed, serving to restore all counters in the network calculator 100 to their first positions. The operation thus is restored to state 1 in condition for receipt of the next request.

In those instances in which the line connected to an input switch is released first, a similar operation is performed in executing the release of the appropriate switches, with the operations performed in the states 68–73 replacing those performed in states 60–65.

*Auxiliary Switching*

In the establishment of connections through the network it is evident that when a blocking situation is presented, existing connections through the network may be disturbed during the brief interval of rearrangement to unblock the network for the potential new connection. Thus, for example, an established connection through intermediate switch S2 will be temporarily cut off while it is being reestablished through intermediate switch S1 in order to permit the establishment of an otherwise blocked connection through intermediate switch S2.

The break in service which may be encountered in this transfer of an existing connection to a different intermediate switch may be overcome in accordance with this invention by the utilization of one of the intermediate switches as an auxiliary switch. Thus the three-stage network of FIG. 1, each stage requiring $n$, $n \times n$ switches, may be modified to present a three-stage network in which the input and output stages each consists of $n$, $n \times (n+1)$ switches and the intermediate stage consists of $n+1$, $n \times n$ switches. Each input and output stage switch in this modified network will have one link with each intermediate stage switch in the same fashion as depicted in FIG. 1. It is now possible to reserve one of the intermediate switches for use only in those instances when a blocking situation presents itself. Thus in normal operation the network is the same as that depicted in FIG. 1; viz., a three-stage network with each stage having $n$, $n \times n$ switches, the additional intermediate switch being withheld from use on normal connections.

Considering then the network depicted in FIG. 1, it will be assumed that intermediate switch S1 is the auxiliary switch reserved for use in blocking situations. The balance of the switches in the intermediate stage S2—S$n$ will then correspond in number to the switches I1—I$n$ or O1—O$n$. Assume now that a blocking situation exists which requires changes in intermediate switches S2 and S$n$ in order to unblock the network for the potential new connection. Thus a certain set of connections through intermediate switch S2 will be taken down and reestablished through intermediate switch S$n$ and vice versa in order to free either switch S2 or S$n$ to handle the blocked connection.

In the disestablishment of each such active connection, actual interruption is avoided by the simultaneous establishment of each connection through the auxiliary switch S1. Thus in the instant example, for every connection through intermediate switch S2 which the network control 100 has elected to change, a corresponding connection is established through the auxiliary intermediate switch S1. The regular network connections through intermediate switch S2 which are involved in the rearrangement are then taken down, but the active connections are maintained through the auxiliary switch S1.

Thereafter, every active connection through intermediate switch S$n$ which is involved in the network rearrangement is duplicated through intermediate switch S2. This is always possible since all of the connections through intermediate switch S2 which might prevent the transfer of connections from intermediate switch S$n$ have already been transferred to auxiliary switch S1. Thereafter, all of the connections through intermediate switch S$n$ which have now been duplicated through intermediate switch S2 are taken down.

Finally, connections are established through intermediate switch S$n$ corresponding to each connection priorly established through the auxiliary intermediate switch S1, and all connections through S1 are taken down.

The network control 100 provides orders to the network in terms of particular input, intermediate and output switches and links therebetween. The auxiliary switch operation demands that the following network operations be satisfied in addition to those described hereinbefore. Each order to take down a connection during an unblocking operation will also activate the auxiliary intermediate switch. As the rearrangement of the connections at this time only involves intermediate switches, the input and output switches involved in the connections remain active, and the particular levels carrying the connection are now linked with the auxiliary intermediate switch.

In similar fashion, if the initial order to take down a particular connection through a first intermediate switch is followed by an order to take down a connection through a second intermediate switch, this latter connection is first established through the first intermediate switch in the position vacated by the connection newly-established through the auxiliary switch. This may be readily accomplished by the network control storing an indication of the first intermediate switch upon execution of the prior order and directing the new order information to the first intermediate switch as well as to the second switch.

Thereafter the connections through the second intermediate switch and the auxiliary switch are taken down, the latter operation being performed by a signal from the final order in the order memory 150 which serves to establish the potential new connection through the network.

The particular manner in which the auxiliary intermediate switch is utilized in the performance of this unblocking operation without disturbance to existing connections is not of immediate concern to the instant invention but merely indicates a possible advantage to the employment of a network control type operation in accordance with this invention, serving to unblock a multistage network through physical rearrangement of existing network connections.

It is to be understood that the above-described arrangements are illustrative of the application of the principles of the invention. Numerous other arrangements may be devised by those skilled in the art without departing from the spirit and scope of the invention. For example, the only limitation on the network to accomplish the unblocking operation is the availability of both the input and output lines desiring connection through the network, assuming of course that the input and output switches themselves are nonblocking. The size and number of switches employed in each state are not of concern to the success of the unblocking operation. Also, additional stages may be added to the network, or switches added to or subtracted from particular stages, without affecting the basic principles for unblocking a network as considered herein.

What is claimed is:

1. In a system comprising switching apparatus arranged in a multistage network, control means comprising means for operating the switching apparatus to establish a plurality of line-to-line connections through the network, means for detecting the presence of a blocking condition in the network with respect to a potential connection and means for operating the switching apparatus while said established connections are active to effect a rearrangement of certain of said plurality of established connections to remove the blocking condition.

2. The combination according to claim 1 wherein said control means further comprises means for avoiding the disturbance of lines involved in said established connections including means for directing the utilization of auxiliary switching means during the revision of said certain ones of said plurality of established connections.

3. A multistage switching network control circuit comprising means for maintaining a record of each active connection through the network, means for accepting a request for a new connection, means activated by said accepting means for interrogating the record maintaining means to determine the availability of a path through the network for the requested connection, and means operative upon the failure of said record maintaining means to locate a free path through the network for formulating orders to rearrange active network connections in order to establish the requested connection.

4. A network control circuit according to claim 3 and further comprising means for checking the accuracy of the orders formulated by said order formulating means comprising means for comparing the formulated orders with the content of the record maintaining means, and means operative upon completion of the order comparison for transmitting the orders to the network for execution.

5. A network control circuit according to claim 3 wherein said order formulating means comprises distinct means for formulating orders to disconnect an active network connection and other means for formulating orders to reestablish the disconnected active network connection through another network path.

6. A network control circuit according to claim 4 wherein said order transmitting means comprises means responsive to an order to disconnect an active network connection for transmitting the order to one portion of the network to establish an auxiliary network connection and for transmitting the order to another portion of the network to disestablish the active network connection.

7. A circuit for controlling the establishment of line-to-line connections through a multistage switching network comprising means for recording all currently established connections, means for recognizing the inability of the network to serve a potential new connection, means activated by said recognizing means for determining a minimum number of changes in the currently established connections through the network as registered in said recording means necessary to free a path for the potential new connection, and means for activating said determining means to effect the network change orders through a physical rearrangement of certain of the currently established connections.

8. A control circuit according to claim 7 wherein the switching network comprises input, intermediate and output stages, each stage in turn comprising a plurality of switches, and wherein the recording means comprises network memory means defining the input, intermediate and output stage switches involved in each currently established connection.

9. A control circuit according to claim 8 wherein said recognizing means comprises means for interrogating said network memory means in sequence with the input and output stage switch designations corresponding to the respective lines involved in the potential new connection concurrently with a designation of each of the intermediate stage switches.

10. A control circuit according to claim 8 wherein said network memory means comprises an output network memory storing indications of active output stage switches and an input network memory storing indications of active input stage switches, and wherein said recognizing means comprises means for applying a designation of the output stage switch involved in the potential new connection to the input network memory, means for applying a designation of the input stage switch involved in the potential new connection to the output network memory and means for applying designations of each intermediate stage switch in sequence to said input and output network memories.

11. A control circuit according to claim 10 wherein said determining means comprises an order memory for storing a sequence of connect and disconnect orders involving the currently established network connections.

12. A control circuit according to claim 11 wherein said determining means further comprises means for comparing the particular switch designations stored in the order memory with the particular switch designations stored in the network memory means to assure that correct orders have been recorded in the order memory and means for altering the switch designations in the order memory in response to the comparison resultants.

13. In a system having a plurality of lines terminated on a multistage network of switching means, a circuit for controlling the rearrangement of active line-to-line connections through said network to permit the establishment of a new connection between a pair of lines initially blocked by the active network connections comprising network memory means, means for recording in said network memory means the identity of said switching means involved in each active network connection, means responsive to the receipt of a request to serve the potential new connection for examining the network memory to locate an available path through the network, an order memory, means responsive to an indication from the network memory means signifying that all paths through the network are presently occupied to record in said order memory various changes in active network connections necessary to unblock the network to the potential new connection, and means for activating said order memory to direct the stored orders to the network.

14. The combination according to claim 13 wherein said control circuit further comprises means for recording the altered network connections in said network memory means responsive to a signal from said network indicating that orders directed to said network by said order memory have been carried out in said network.

15. The combination according to claim 14 wherein said control circuit further comprises means responsive to a signal from said network indicating the release of a line involved in one of said active connections for determining all of the switching means involved in said one of said active connections and for producing orders directed to the disestablishment of said one of said active connections through said network.

16. The combination according to claim 15 wherein said switching means comprises an auxiliary switch which is utilized only in the presence of a blocking condition to serve active connections during their reestablishment, and wherein said control means comprises means for transmitting orders to said auxiliary switch to establish connections corresponding to those disestablished through other switching means pursuant to a network rearrangement.

17. A control circuit for a multistage switching network comprising means for determining the availability of a path through the network to serve a request for a connection, means operative in response to an indication by said availability determining means that a network path is not available for determining a rearrangement of active network connections which will provide a path through said network to serve the connection request, and means activated by said rearrangement determining means for transmitting orders to said network to execute the predetermined network rearrangement.

18. A network control circuit according to claim 17 wherein the network includes $n$, $n \times n$ switches per stage, said rearrangement determining means comprising means for requiring the disturbance of no more than $n-1$ active network connections.

19. A network control circuit according to claim 18 where $n$ is greater than 1, said rearrangement determining means comprising means for determining the existence of at least one rearrangement in which $n-1$ active connections must be disturbed to provide a path for the requested connection.

20. A network control circuit according to claim 18 wherein the network includes input, intermediate and output stages, said rearrangement determining means comprising means for requiring the disturbance of no more than two intermediate stage switches.

References Cited in the file of this patent
UNITED STATES PATENTS

| | | |
|---|---|---|
| 2,244,004 | Erwin | June 3, 1941 |
| 2,274,083 | Miller | Feb. 24, 1942 |
| 2,431,313 | DenHertog | Nov. 25, 1947 |
| 2,863,947 | Scheunert | Dec. 9, 1958 |
| 2,986,723 | Darwin et al. | May 30, 1961 |
| 3,068,324 | Warman | Dec. 11, 1962 |